United States Patent
Ohta

(10) Patent No.: US 10,710,502 B2
(45) Date of Patent: Jul. 14, 2020

(54) IN-VEHICLE ALERT APPARATUS AND ALERT METHOD

(71) Applicant: TOYOTA JIDOSHA KABUSHIKI KAISHA, Toyota-shi, Aichi-ken (JP)

(72) Inventor: Teppei Ohta, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 407 days.

(21) Appl. No.: 15/837,490

(22) Filed: Dec. 11, 2017

(65) Prior Publication Data
US 2018/0170257 A1  Jun. 21, 2018

(30) Foreign Application Priority Data
Dec. 15, 2016 (JP) ................. 2016-242913

(51) Int. Cl.
  *B60Q 9/00* (2006.01)
  *B60K 35/00* (2006.01)

(52) U.S. Cl.
  CPC .............. *B60Q 9/008* (2013.01); *B60K 35/00* (2013.01); *B60K 2370/152* (2019.05); *B60K 2370/178* (2019.05); *B60K 2370/179* (2019.05); *B60K 2370/186* (2019.05); *B60K 2370/193* (2019.05)

(58) Field of Classification Search
None
See application file for complete search history.

(56) References Cited

U.S. PATENT DOCUMENTS

| | | | | |
|---|---|---|---|---|
| 2004/0083035 A1* | 4/2004 | Ellis | ................ | A61H 3/068 701/1 |
| 2014/0032053 A1* | 1/2014 | Mochizuki | ............ | G08G 1/161 701/45 |
| 2017/0115742 A1* | 4/2017 | Xing | ................ | G06F 3/015 |
| 2017/0225617 A1 | 8/2017 | Morimura et al. | | |

FOREIGN PATENT DOCUMENTS

| JP | 2015-141490 A | 8/2015 |
|---|---|---|
| JP | 2017-138817 A | 8/2017 |

* cited by examiner

*Primary Examiner* — Richard M Camby
(74) *Attorney, Agent, or Firm* — Oliff PLC

(57) ABSTRACT

An in-vehicle alert apparatus includes an object information acquiring unit, a vehicle status information acquiring unit, a display unit, and an electronic control unit. The electronic control unit determines whether or not an alert target exists outside a field of view of a driver, and displays, as an alert screen, a single display screen when one alert target is selected, a whole display screen when two alert targets are selected and all of the two alert targets are determined to exist within the field of view of the driver, and an individual display screen when two alert targets are selected and an alert target having the highest alert degree is determined to exist outside the field of view of the driver.

11 Claims, 14 Drawing Sheets

IN-VEHICLE ALERT APPARATUS AND ALERT METHOD

INCORPORATION BY REFERENCE

The disclosure of Japanese Patent Application No. 2016-242913 filed on Dec. 15, 2016 including the specification, drawings and abstract is incorporated herein by reference in its entirety.

BACKGROUND

1. Technical Field

The disclosure relates to an in-vehicle alert apparatus and an alert method that alert a driver to an alert target by using a display unit when an alert target to which the driver has to be alerted is detected around a host vehicle.

2. Description of Related Art

One of in-vehicle alert apparatuses in the related art (hereinafter, referred to as "an apparatus in the related art") alerts a driver to an obstacle by displaying an object indication image that indicates an object existing around a host vehicle. Such an apparatus is suggested in, for example, Japanese Unexamined Patent Application Publication No. 2015-141490 (JP 2015-141490 A) (refer to paragraph 0023 to paragraph 0025, FIG. 4, and the like). The apparatus suggested in JP 2015-141490 A (refer to paragraph 0023 to paragraph 0025, FIG. 4, and the like) provides alert for an alert target by displaying an object indication image indicating an object around a vehicle at a focal length corresponding to the distance to the object.

SUMMARY

When a plurality of obstacles is detected, the apparatus in the related art displays object indication images indicating the directions of the obstacles at the same time. In such a case, the direction in which a driver has to be alerted cannot be determined. Thus, the driver may be confused, and the driver cannot be appropriately alerted. When an obstacle exists outside a field of view of the driver, there is a relatively high possibility of being unable to guide a line of sight of the driver to the obstacle existing outside the field of view of the driver when one indication image that indicates all directions including the directions of the obstacles is displayed. Consequently, the driver cannot be appropriately alerted to the obstacle existing outside the field of view of the driver.

The present disclosure provides an in-vehicle alert apparatus and an alert method that can appropriately alert a driver to a plurality of obstacles, particularly, an obstacle existing outside a field of view of the driver.

A first aspect of the present disclosure relates to an in-vehicle alert apparatus including an object information acquiring unit configured to acquire object information related to a position and a direction of an object around a host vehicle with respect to the host vehicle, a vehicle status information acquiring unit configured to acquire vehicle status information related to a traveling status of the host vehicle, a display unit configured to display of an alert screen which guides a line of sight of a driver, and an electronic control unit. The electronic control unit is configured to: extract, based on the object information and the vehicle status information, obstacles having a possibility of colliding with the host vehicle; calculate, based on at least the object information, an alert degree indicating a degree of providing alert for each obstacle; select, based on the alert degree, each of two obstacles including an obstacle having the highest alert degree as an alert target from the obstacles; and display the alert screen on the display unit. The electronic control unit determines whether or not the alert target exists outside a field of view of the driver. When one alert target is selected, the electronic control unit displays a single display screen as the alert screen. The single display screen includes one display element that guides the line of sight of the driver in a direction of the one alert target. When two alert targets are selected and all of the two alert targets are determined to exist within the field of view of the driver, the electronic control unit displays a whole display screen as the alert screen. The whole display screen includes one display element that guides the line of sight of the driver in a direction of a wide-angle range including a direction of each of the two alert targets. When two alert targets are selected and an alert target having the highest alert degree is determined to exist outside the field of view of the driver, the electronic control unit displays an individual display screen as the alert screen. The individual display screen includes one display element that guides the line of sight of the driver in a direction of at least the alert target determined to exist outside the field of view of the driver.

When two alert targets exist, a situation in which the driver is confused due to the line of sight of the driver guided by two display elements in directions of two alert targets may occur. Therefore, when two alert targets exist and the two alert targets exist within the field of view of the driver, the in-vehicle alert apparatus displays the whole display screen. The whole display screen includes one display element that guides the line of sight of the driver in a direction of a wide-angle range including a direction of each of the two alert targets existing within the field of view of the driver. Accordingly, the occurrence of the situation can be prevented.

When two alert targets exist and an alert target exists outside the field of view of the driver, the line of sight of the driver may not be guided in a direction of the alert target existing outside the field of view of the driver when the whole display screen is displayed. Therefore, when two alert targets exist and an alert target having the highest alert degree exists outside the field of view of the driver, the in-vehicle alert apparatus displays the individual display screen. The individual display screen includes a display element that guides the line of sight of the driver in a direction of at least the alert target that is determined to exist outside the field of view of the driver. Accordingly, the line of sight of the driver can be securely guided in a direction of the alert target existing outside the field of view of the driver (that is, in such a case, the alert target having the highest alert degree).

The first aspect of the present disclosure can appropriately alert the driver to a plurality of obstacles and particularly, can alert the driver to at least the alert target having the highest alert degree when the alert target having the highest alert degree exists outside the field of view of the driver.

In the in-vehicle alert apparatus according to the first aspect of the present disclosure, the electronic control unit may determine that the alert target exists within the field of view of the driver, when a magnitude of an angle between a field-of-view inside and outside determination reference line that extends forward along an axis extending in a front-rear direction of the host vehicle from a predetermined position in the host vehicle, and a direction line from the predetermined position to the alert target is less than a field-of-view inside and outside determination threshold. The electronic control unit may determine that the alert target exists outside the field of view of the driver, when the magnitude of the angle is greater than or equal to the field-of-view inside and outside determination threshold.

Accordingly, a determination as to whether or not the alert target exists outside the field of view of the driver can be accurately performed with a simple configuration.

In the in-vehicle alert apparatus according to the first aspect of the present disclosure, the predetermined position may be set to a position between a backrest portion of a driver seat on which the driver sits, and a steering wheel disposed in front of the backrest portion.

Accordingly, a determination as to whether or not the alert target exists outside the field of view of the driver is performed with the position of eyes of the driver in a sit position as a reference. Therefore, a determination as to whether or not the alert target exists outside the field of view of the driver can be more accurately performed.

In the in-vehicle alert apparatus according to the first aspect of the present disclosure, the electronic control unit may set the field-of-view inside and outside determination threshold such that the field-of-view inside and outside determination threshold is decreased as a magnitude of a vehicle speed of the host vehicle is greater.

The field of view of the driver is narrowed as the magnitude of the vehicle speed of the host vehicle in the forward direction is greater. Thus, the first aspect of the present disclosure can change the field-of-view inside and outside determination threshold in accordance with the change in the field of view of the driver. Therefore, a determination as to whether or not the alert target exists outside the field of view of the driver can be more accurately performed.

In the in-vehicle alert apparatus according to the first aspect of the present disclosure, in a case of displaying the individual display screen, when the alert target that does not have the highest alert degree of the two selected alert targets is determined not to exist outside the field of view of the driver, the electronic control unit may display a screen as the individual display screen. The screen may include the one display element that guides the line of sight of the driver in a direction of the alert target determined to exist outside the field of view of the driver, and another display element that guides the line of sight of the driver in a direction of the alert target determined not to exist outside the field of view of the driver.

Accordingly, the line of sight of the driver is guided in a direction of the alert target that exists outside the field of view of the driver and has the highest alert degree. The line of sight of the driver is also guided in a direction of the alert target that exists within the field of view of the driver and does not have the highest alert degree.

In the in-vehicle alert apparatus according to the first aspect of the present disclosure, the electronic control unit may be configured to select, based on the alert degree, the obstacle having the highest alert degree and an obstacle having the second highest alert degree as the alert target from the obstacles. When two alert targets are selected and the alert target having the second highest alert degree exists outside the field of view of the driver, the electronic control unit may display an individual display screen as the alert screen. The individual display screen may include one display element that guides the line of sight of the driver in a direction of at least the alert target having the second highest alert degree.

Accordingly, even when the alert target having the second highest alert degree of two alert targets exists outside the field of view of the driver, the line of sight of the driver can be securely guided to the alert target having the second highest alert degree.

In the in-vehicle alert apparatus according to the first aspect of the present disclosure, when two alert targets are selected with one of the two alert targets existing outside the field of view of the driver and the other not existing outside the field of view of the driver, the electronic control unit may extract an obstacle having the third highest alert degree from the obstacles and determine whether or not the extracted obstacle exists outside the field of view of the driver. When an obstacle having the third highest alert degree exists and the obstacle is determined not to exist outside the field of view of the driver, the electronic control unit may display a screen as the individual display screen. The screen may include one display element that guides the line of sight of the driver in a direction of the alert target determined to exist outside the field of view of the driver, and one display element that guides the line of sight of the driver in a direction of a wide-angle range including a direction of each of the alert target determined not to exist outside the field of view of the driver and the obstacle having the third highest alert degree.

Accordingly, when one of two alert targets exists outside the field of view of the driver, and the other one alert target and an obstacle having the third highest alert degree exist within the field of view of the driver, the line of sight of the driver can be guided in a direction of the one alert target existing outside the field of view of the driver. Furthermore, in such a case, with confusion of the driver more reduced, the line of sight of the driver can be guided in a direction of a wide-angle range including a direction of each of the one alert target and the obstacle having the third highest alert degree existing within the field of view of the driver.

In the in-vehicle alert apparatus according to the first aspect of the present disclosure, the electronic control unit may be configured to select, based on the alert degree, the obstacle having the highest alert degree and an obstacle having the second highest alert degree as the alert target from the obstacles. When two alert targets are selected, the electronic control unit may determine whether or not a magnitude of a difference in alert degree between the two alert targets is less than or equal to a predetermined threshold. When the magnitude of the difference in alert degree is greater than the predetermined threshold, the electronic control unit may display the single display screen including one display element that guides the line of sight of the driver in a direction of the alert target having the highest alert degree. When the magnitude of the difference in alert degree is less than or equal to the predetermined threshold and all of the two alert targets are determined to exist within the field of view of the driver, the electronic control unit may display the whole display screen. When the magnitude of the difference in alert degree is less than or equal to the predetermined threshold and the alert target having the highest alert degree exists outside the field of view of the driver, the electronic control unit may display the individual display screen.

Accordingly, even when two alert targets are selected, the single display screen is displayed when the magnitude of the difference in alert degree between the two alert targets is greater than the threshold. In such a case, the single display screen includes one display element that guides the line of sight of the driver in a direction of the alert target having the highest alert degree. Thus, when the magnitude of the difference in alert degree between the two alert targets is greater than the threshold, the line of sight of the driver can be securely guided in a direction of the alert target having the highest alert degree. When the magnitude of the difference in alert degree between the two alert targets is less than or equal to the threshold, any of the first individual display screen and the whole display screen is displayed. Consequently, the line of sight of the driver can be guided in directions of the two alert targets. When an alert target exists outside the field of view of the driver, the line of sight of the driver can be securely guided to the alert target.

In the in-vehicle alert apparatus according to the first aspect of the present disclosure, the electronic control unit may divide an area around a front of the host vehicle into a first area on a left side of the host vehicle and a second area on a right side of the host vehicle, and select each of an obstacle having the highest alert degree in the first area and an obstacle having the highest alert degree in the second area as the alert target from the obstacles. When two alert targets are selected and at least one of the two alert targets is determined to exist outside the field of view of the driver, the electronic control unit may display a screen as the individual display screen. The screen may include the one display element that guides the line of sight of the driver in a direction of one of the two alert targets, and the one display element that guides the line of sight of the driver in a direction of the other of the two alert targets.

Accordingly, in the individual display screen, the line of sight of the driver can be guided in a direction of the obstacle for which alert has to be provided preferentially in each of the first area and the second area. When all of the two alert targets exist within the field of view of the driver, the whole display screen is displayed, and the driver is not confused. When at least one of the two alert targets exists outside the field of view of the driver, the line of sight of the driver is guided in a direction of the alert target by an individual display element. Thus, when at least one alert target exists outside the field of view of the driver, the line of sight of the driver is securely guided in a direction of the alert target.

In the in-vehicle alert apparatus according to the first aspect of the present disclosure, the electronic control unit may divide an area around a front of the host vehicle into a first area on a left side of the host vehicle and a second area on a right side of the host vehicle, and select each of an obstacle having the highest alert degree in the first area and an obstacle having the highest alert degree in the second area as the alert target from the obstacles. When two alert targets are selected with one of the two alert targets determined to exist outside the field of view of the driver and the other determined not to exist outside the field of view of the driver, the electronic control unit may extract an obstacle having the second highest alert degree in one area of the first area and the second area where the alert target determined to exist outside the field of view of the driver exists. When an obstacle having the second highest alert degree does not exist, and when an obstacle having the second highest alert degree exists and the obstacle is determined to exist outside the field of view of the driver, the electronic control unit may display a screen as the individual display screen. The screen may include the one display element that guides the line of sight of the driver in a direction of an alert target, of the two alert targets, determined to exist outside the field of view of the driver, and the one display element that guides the line of sight of the driver in a direction of the remaining alert target of the two alert targets. When an obstacle having the second highest alert degree exists and the obstacle is determined not to exist outside the field of view of the driver, the electronic control unit may display a screen as the individual display screen. The screen may include the one display element that guides the line of sight of the driver in a direction of an alert target, of the two alert targets, determined to exist outside the field of view of the driver, and one display element that guides the line of sight of the driver in a direction of a wide-angle range including a direction of the remaining alert target of the two alert targets and a direction of the obstacle having the second highest alert degree.

Accordingly, when one of two alert targets exists outside the field of view of the driver, and the other alert target and an "obstacle having the second highest alert degree in one area of the first area and the second area where the alert target exists outside the field of view of the driver" exist within the field of view of the driver, the line of sight of the driver can be guided in a direction of the one alert target existing outside the field of view of the driver. Furthermore, in such a case, the line of sight of the driver can be guided in a direction of a wide-angle range including a direction of each of the one alert target existing within the field of view of the driver and the "obstacle having the second highest alert degree in one area of the first area and the second area where the alert target exists outside the field of view of the driver". Thus, without confusing the driver, the line of sight of the driver can be securely guided to the alert target existing outside the field of view of the driver.

A second aspect of the present disclosure relates to an alert method of a vehicle including an object information acquiring unit configured to acquire object information related to a position and a direction of an object around a host vehicle with respect to the host vehicle, a vehicle status information acquiring unit configured to acquire vehicle status information related to a traveling status of the host vehicle, a display unit configured to display of an alert screen which guides a line of sight of a driver, and an electronic control unit. The electronic control unit is configured to; extract, based on the object information and the vehicle status information, obstacles having a possibility of colliding with the host vehicle; calculate, based on at least the object information, an alert degree indicating a degree of providing alert for each obstacle; select, based on the alert degree, each of two obstacles including an obstacle having the highest alert degree as an alert target from the obstacles; and display the alert screen on the display unit.

The alert method includes determining whether or not the alert target exists outside a field of view of the driver; when one alert target is selected, displaying a single display screen as the alert screen, the single display screen including one display element that guides the line of sight of the driver in a direction of the one alert target; when two alert targets are selected and all of the two alert targets are determined to exist within the field of view of the driver, displaying a whole display screen as the alert screen, the whole display screen including one display element that guides the line of sight of the driver in a direction of a wide-angle range including a direction of each of the two alert targets; and when two alert targets are selected and an alert target having the highest alert degree is determined to exist outside the field of view of the driver, displaying an individual display screen as the alert screen, the individual display screen including one display element that guides the line of sight of the driver in a direction of at least the alert target determined to exist outside the field of view of the driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an in-vehicle alert apparatus according to each embodiment of the present disclosure will be described by using the drawings.

First Embodiment

Figure 1:
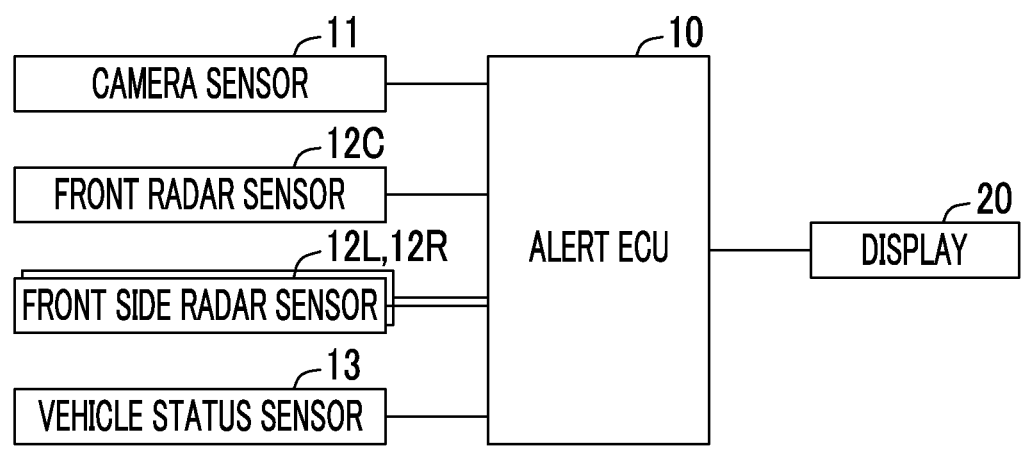
FIG. 1 is a schematic system configuration diagram of an in-vehicle alert apparatus according to a first embodiment of the present disclosure.

FIG. 1 is a schematic system configuration diagram of an in-vehicle alert apparatus according to a first embodiment of the present disclosure (hereinafter, referred to as a "first apparatus"). The first apparatus is an apparatus that is mounted in a vehicle and alerts a driver (operator) of the vehicle to an alert target (that is, an apparatus that provides alert for an alert target). The vehicle in which the in-vehicle alert apparatus is mounted is referred to as a "host vehicle" when the vehicle is distinguished from another vehicle. The first apparatus includes an alert ECU 10 (an example of an electronic control unit). ECU is the abbreviation for "Electronic Control Unit" and includes a microcomputer as a main part. The microcomputer includes a CPU and a storage such as a ROM and a RAM. The CPU realizes various functions by executing instructions (programs and routines) stored in the ROM.

The first apparatus includes a camera sensor 11, a front radar sensor 12C, front side radar sensors 12L, 12R, a vehicle status sensor 13, and a display 20. The alert ECU 10 is connected to the constituent elements.

The camera sensor 11 includes a vehicle-mounted stereocamera that captures a view in front of the host vehicle, and an image processing device that processes the image captured by the vehicle-mounted stereocamera (any of the vehicle-mounted stereocamera and the image processing device is not illustrated).

The vehicle-mounted stereocamera transmits an image signal representing the captured image to the image processing device each time a predetermined time period elapses.

The image processing device determines whether or not an object exists in the captured area based on the received image signal. When the image processing device determines that an object exists, the image processing device calculates the position of the object and identifies the type of object (a pedestrian, a bicycle, an automobile, and the like). The position of the object is specified by the direction of the object with respect to the host vehicle and the distance between the object and the host vehicle.

The camera sensor 11 outputs information indicating the position of the object and information indicating the type of object to the alert ECU 10 each time a predetermined time period elapses. The alert ECU 10 specifies a change in the position of the object based on the information indicating the position of the object. The information is included in object information that is input into the alert ECU 10. The alert ECU 10 finds a relative speed and a relative movement trajectory of the object with respect to the host vehicle based on the specified change in the position of the object.

Figure 2:
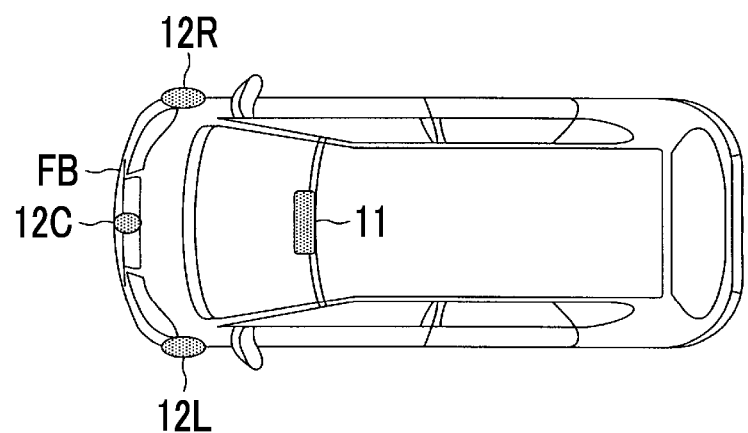
FIG. 2 is a descriptive diagram of positions in which a radar sensor and a camera sensor illustrated in FIG. 1 are attached.

As illustrated in FIG. 2, the front radar sensor 12C is disposed in a position at the center of a front bumper FB of the host vehicle in a vehicle width direction. The front side radar sensor 12R is disposed in a right corner portion of the front bumper FB. The front side radar sensor 12L is disposed in a left corner portion of the front bumper FB. Hereinafter, the front radar sensor 12C and the front side radar sensors 12L, 12R will be collectively referred to as a "radar sensor 12".

The radar sensor 12 radiates an electric wave in a millimeter wave band (hereinafter, referred to as a "millimeter wave"). When an object exists within the range of radiation of the millimeter wave, the object reflects the millimeter wave radiated from the radar sensor 12. The radar sensor 12 receives the reflective wave and detects the distance between the host vehicle and the object, the direction of the object with respect to the host vehicle, and the like based on the reflective wave.

Figure 3:
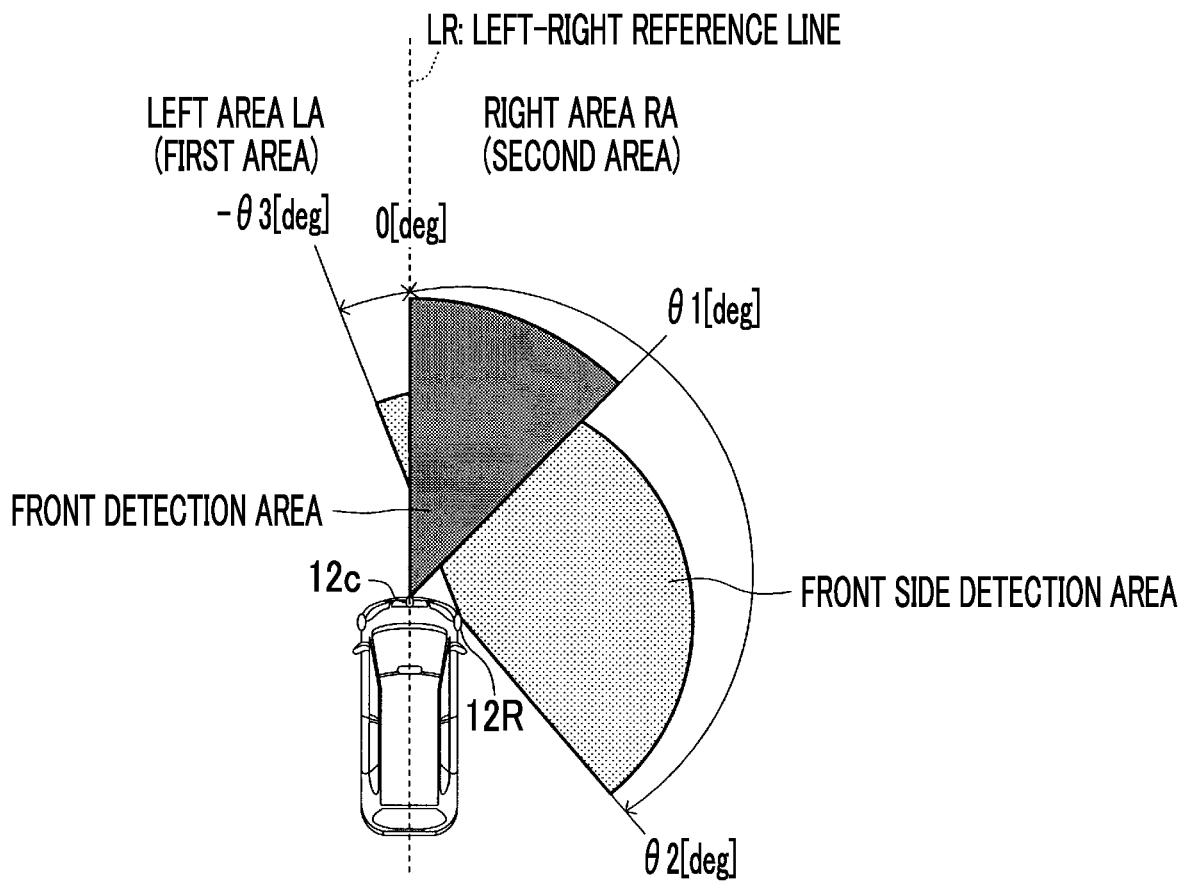
FIG. 3 is a descriptive diagram of a detection area of the radar sensor illustrated in FIG. 1.

As illustrated in FIG. 3, a detection area of the front radar sensor 12C has a range of ±θ1 deg (0 deg<θ1<90 deg) in a right-left direction from a vehicle front-rear axis (the front side is 0 deg) (FIG. 3 does not illustrate the range in the left direction). Accordingly, the front radar sensor 12C mainly detects an object in front of the host vehicle. A detection area of the front side radar sensor 12R is θ2 deg (90 deg<θ2<180 deg) in the right direction and −θ3 deg (0 deg<θ3<90 deg) in the left direction from the vehicle front-rear axis. Accordingly, the front side radar sensor 12R mainly detects an object at the right of the host vehicle. Though not illustrated, a detection area of the front side radar sensor 12L is an area that is right-left symmetric with the detection area of the front side radar sensor 12R about the vehicle front-rear axis as an axis of symmetry. Accordingly, the front side radar sensor 12L mainly detects an object at the left of the host vehicle. A detection distance of each of the radar sensors 12C, 12L, 12R is, for example, a few tens of meters. Each of the radar sensors 12C, 12L, 12R detects positional information of the object (the distance between the host vehicle and the object and the direction of the object with respect to the host vehicle) each time a predetermined time period elapses, and transmits the detected positional information to the alert ECU 10 each time a predetermined time period elapses. Accordingly, the alert ECU 10 finds the relative speed and the relative movement trajectory of the object with respect to the host vehicle from a change in the positional information of the object.

Hereinafter, information of the object detected by the camera sensor 11 and the radar sensor 12 (includes the information indicating the position of the object and the information indicating the type of the object) will be referred to as the object information.

The vehicle status sensor 13 is a sensor that acquires vehicle status information related to a traveling status of the host vehicle which is used for estimating a traveling course of the host vehicle. The vehicle status sensor 13 includes a vehicle speed sensor that detects the speed of a vehicle body (that is, a vehicle speed), an acceleration sensor that detects the acceleration of the vehicle body in the horizontally front-rear direction and the horizontally right-left (transverse) direction, a yaw rate sensor that detects the yaw rate of the vehicle body, a steering angle sensor that detects the steering angle of a steering wheel, and the like. The vehicle status sensor 13 outputs the vehicle status information to the alert ECU 10 each time a predetermined time period elapses.

The alert ECU 10 calculates the turning radius of the host vehicle based on the vehicle speed detected by the vehicle speed sensor and the yaw rate detected by the yaw rate sensor, and estimates a traveling course of the host vehicle (actually, the center point on an axle of right and left front wheels of the host vehicle) as a predicted traveling course based on the turning radius. When the yaw rate is generated, the predicted traveling course has an arc shape. When the yaw rate is zero, the alert ECU 10 estimates a linear course extending in the direction of the acceleration detected by the acceleration sensor as the traveling course of the host vehicle (that is, the predicted traveling course). The alert ECU 10 recognizes and determines the predicted traveling course as a path (line segment) from the host vehicle to a location at a predetermined distance along the predicted traveling course regardless of whether the host vehicle is turning or traveling straight.

The display 20 is a head-up display (hereinafter, referred to as an "HUD"). The HUD receives display information from various ECUs and a navigation device in the host vehicle and projects the display information in a partial area (display area) of a windshield of the host vehicle. When an alert target described below is detected, the alert ECU 10 transmits a display instruction for an alert screen to the HUD. Accordingly, the HUD displays, by using a part of the display area, the alert screen (refer to FIG. 4A to FIG. 4C) that guides a line of sight of the driver in the direction of the alert target. The alert screen will be described in detail below.

The display 20 is not particularly limited to the HUD. That is, the display 20 may be a multi-information display (MID), a touch panel of the navigation device, and the like. The MID is a display panel in which meters such as a speedometer, a tachometer, a fuel gauge, a water temperature gauge, an odometer or a trip meter, and a warning lamp are collectively disposed on a dashboard.

Summary of Operation

The alert ECU 10 extracts an object (obstacle) having a possibility of colliding with the host vehicle, by using the object information input from the camera sensor 11 and the radar sensor 12 and the vehicle status information input from the vehicle status sensor 13. The alert ECU 10 calculates a degree of providing alert for each obstacle (hereinafter, referred to as an alert degree) and selects two alert targets including an obstacle having the highest alert degree. The alert ECU 10 displays, on the display 20, the alert screen that guides the sight of the driver in the directions of the selected two alert targets.

More specifically, the alert ECU 10 displays the alert screen as follows. (1) When the number of alert targets is one, the alert ECU 10 displays a single display screen 400 (refer to FIG. 4A). The single display screen 400 includes a sight guiding icon 401 that guides the line of sight of the driver in the direction of the alert target. In the present specification, the sight guiding icon may be referred to as a display element or a sight guiding mark regardless of the type thereof. (2) When the number of alert targets is two and any of the alert targets does not exist outside a field of view of the driver (in other words, when all (that is, two) alert targets exist within the field of view of the driver), the alert ECU 10 displays a whole display screen 410 (refer to FIG. 4B). The whole display screen 410 includes a whole sight guiding icon (a display element or a sight guiding mark) 411 that guides the line of sight of the driver across the whole area between the directions of the two alert targets. The whole sight guiding icon 411 guides the line of sight of the driver to the whole area in front of the host vehicle (when a plurality of alert targets is handled as one large target, guides the line of sight of the driver in the direction of the target). In other words, the whole sight guiding icon 411 is one display element that guides the line of sight of the driver in a direction of a wide-angle range including the direction of each of the two alert targets. In the meaning described above, the sight guiding icon 401 can be referred to as one display element that guides the line of sight of the driver in a direction of a narrow-angle range including the direction of one alert target (a range having a narrow angle than the wide-angle range). (3) When the number of alert targets is two and at least an alert target thereof having the highest alert degree exists outside the field of view of the driver, the alert ECU 10 displays a first individual display screen 420 (refer to FIG. 4C). The first individual display screen 420 includes a sight guiding icon (a display element or a sight guiding mark) 401 that guides the line of sight of the driver in the direction of at least the alert target existing outside the field of view of the driver.

Specific Operation

Figure 5:
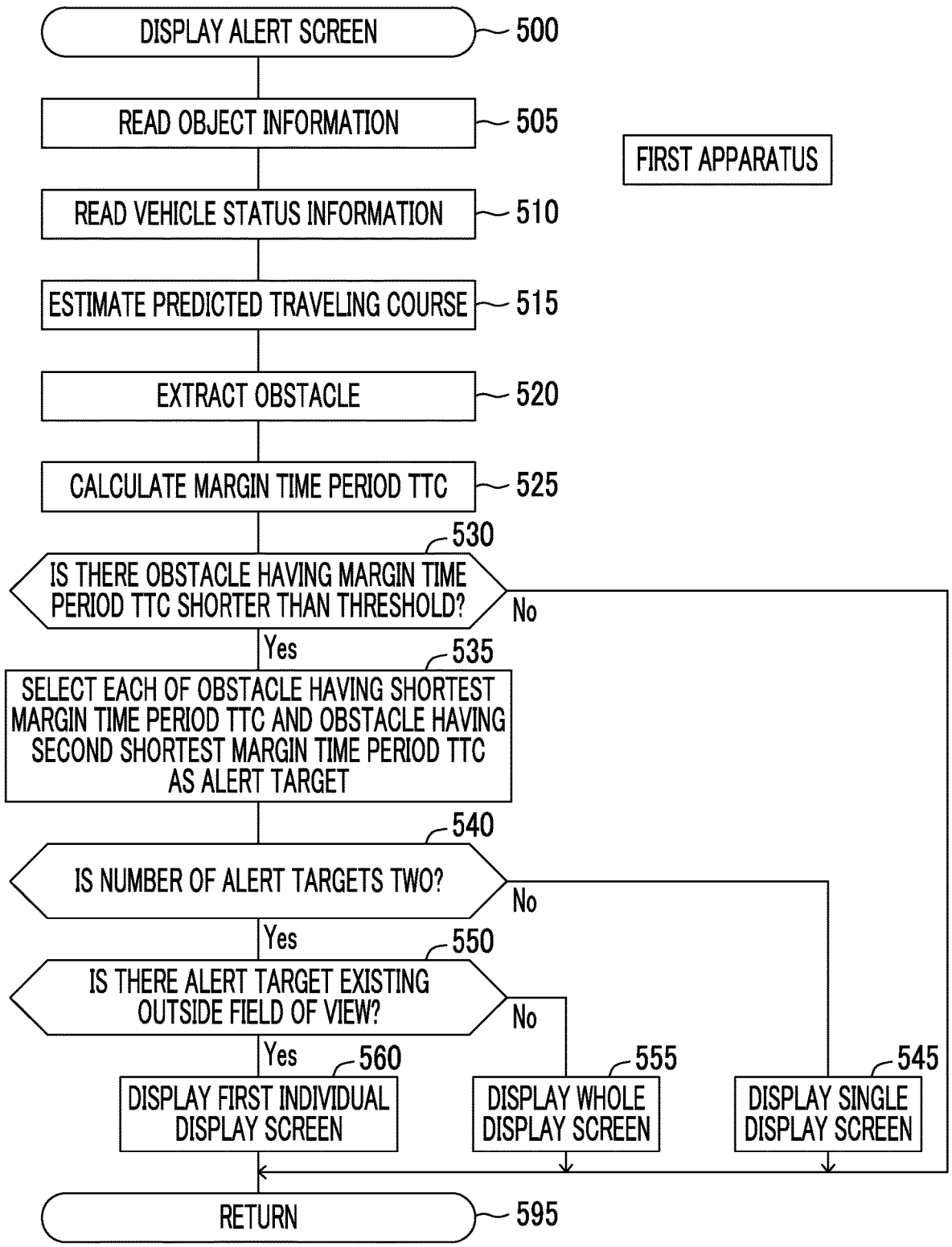
FIG. 5 is a flowchart illustrating a routine executed by a CPU of an alert ECU illustrated in FIG. 1.

The CPU of the alert ECU 10 (hereinafter, the "CPU" will refer to the CPU of the alert ECU 10 unless otherwise specified) executes a routine illustrated in a flowchart in FIG. 5 each time a predetermined time period elapses. The routine in FIG. 5 is a routine that displays the alert screen on the display 20.

When a predetermined timing arrives, the CPU starts from a process of step 500 in FIG. 5, performs processes of step 505 to step 525 described below in order, and transitions to step 530.

Step 505: The CPU reads the object information acquired by the camera sensor 11 and the radar sensor 12.

Step 510: The CPU reads the vehicle status information acquired by the vehicle status sensor 13.

Step 515: The CPU estimates the predicted traveling course based on the vehicle status information read in step 510.

Step 520: Based on the object information read in step 505 and the predicted traveling course estimated in step 515, the CPU extracts, as an obstacle, an object having a possibility of colliding with the host vehicle. More specifically, as described above, the CPU estimates the traveling course of the center point on the axle of the right and left front wheels of the host vehicle as the predicted traveling course. The CPU estimates, as the predicted traveling course, a left-side predicted traveling course (refer to a course LEC in FIG. 7A to FIG. 7C) through which a point positioned on the left side at a certain distance α from a left end portion of the vehicle body of the host vehicle passes, and a right-side predicted traveling course (refer to a course REC in FIG. 7A to FIG. 7C) through which a point positioned on the right side at the certain distance α from a right end portion of the vehicle body of the host vehicle passes. The CPU specifies an area between the left-side predicted traveling course LEC and the right-side predicted traveling course REC as a predicted traveling course area ECA. Based on the predicted traveling course area ECA and a relative relationship (a relative position, a relative speed, and changes in the relative position and the relative speed) between the host vehicle and the object, the CPU extracts, as an object having a possibility of colliding with the host vehicle (that is, an obstacle), an object that already exists within the predicted traveling course area ECA, and an object that is predicted to enter the predicted traveling course area ECA.

Hereinafter, the process of step 520 will be more specifically described. When the front radar sensor 12C detects an object within the detection area thereof, the CPU determines whether or not the object is within the predicted traveling course area ECA and whether or not the object may enter the predicted traveling course area ECA. When the CPU determines that the object is "within the predicted traveling course area ECA or may enter the predicted traveling course area ECA" and the camera sensor 11 determines that the object is a pedestrian, the CPU extracts the pedestrian as an obstacle having a possibility of colliding with the host vehicle.

When the front side radar sensors 12L, 12R detect an object in an area in the detection area thereof excluding the detection area of the front radar sensor 12C, the CPU determines whether or not the object may enter the predicted traveling course area ECA. When the CPU determines that the object may enter the predicted traveling course area ECA, the CPU extracts the object as an obstacle having a possibility of colliding with the host vehicle, regardless of whether or not the object is a pedestrian, a bicycle, an automobile, or the like. Extracting an obstacle by using the front side radar sensors 12L, 12R enables the CPU to extract, as an obstacle, an object, for example, that may enter the predicted traveling course area ECA from a side of the host vehicle at an intersection that the host vehicle enters.

As described above, the CPU estimates the left-side predicted traveling course LEC as a "course through which a point positioned on the left side at the certain distance α from the left end portion of the vehicle body of the host vehicle passes", and estimates the right-side predicted traveling course REC as a "course through which a point positioned on the right side at the certain distance α from the right end portion of the vehicle body of the host vehicle passes". Thus, the CPU determines that an object that may pass on the left side or the right side of the host vehicle (a pedestrian, a bicycle, and the like) is "within the predicted traveling course area ECA or may enter the predicted traveling course area ECA". Accordingly, the CPU can extract, as an obstacle, an object that may pass on the left side or the right side of the host vehicle.

As is understood heretofore, obstacles extracted by the process of step 520 include a pedestrian that exists in front of the host vehicle, a moving object that approaches the predicted traveling course area ECA by intersecting with the right and left predicted traveling courses (LEC and REC) of the host vehicle from a side of the host vehicle, and a moving object that may pass on a side of the host vehicle.

Step 525: The CPU calculates a margin time period time-to-collision (TTC) of each obstacle extracted in the process of step 520. The margin time period TTC is any of the following time periods.

A time period before a point in time when the obstacle is predicted to collide with the host vehicle (a time period from the current point in time to a predicted point in time of collision).

A time period before a point in time when the obstacle enters the predicted traveling course area ECA (a time period from the current point in time to a predicted point in time of entering).

A time period before a point in time when the obstacle that may pass on a side of the host vehicle approaches the closest point to the host vehicle (a time period from the current point in time to a predicted point in time of approaching the closest point).

The margin time period TTC is calculated by assuming that the obstacle and the host vehicle approach each other while maintaining the relative speed and the relative movement direction thereof at the current point in time. For example, when the obstacle is an object that is predicted to collide with the host vehicle, the margin time period TTC is calculated by dividing the relative distance of the obstacle with respect to the host vehicle by the relative speed of the obstacle with respect to the host vehicle.

The margin time period TTC represents a time period in which the driver can operate the host vehicle so as to avoid collision between the host vehicle and the alert target. That is, the margin time period TTC is a parameter representing a degree of emergency and corresponds to the alert degree. That is, the alert degree is higher as the margin time period TTC is shorter. The alert degree is lower as the margin time period TTC is longer.

Next, the CPU transitions to step 530 and determines whether or not the margin time period TTC of each obstacle extracted in step 520 is shorter than a predetermined threshold T1th. The CPU in step 530 also determines whether or not there is at least one obstacle having the margin time period TTC shorter than the predetermined threshold T1th.

When there is no obstacle having the margin time period TTC shorter than the predetermined threshold T1th, the alert screen does not have to be displayed. In such a case, the CPU makes a "No" determination in step 530, transitions to step 595, and temporarily finishes the present routine. Consequently, the alert screen is not displayed.

When there is an obstacle having the margin time period TTC shorter than the predetermined threshold T1th, the alert screen has to be displayed. In such a case, the CPU makes a "Yes" determination in step 530 and transitions to step 535. The CPU in step 535 selects an obstacle having the shortest margin time period TTC and an obstacle having the second shortest margin time period TTC as alert targets from the obstacles having the margin time period TTC shorter than the predetermined threshold T1th. When the number of obstacles having the margin time period TTC shorter than the predetermined threshold T1th is one, the CPU cannot select two alert targets and selects one obstacle having the margin time period TTC shorter than the predetermined threshold T1th as an alert target.

Next, the CPU transitions to step 540 and determines whether or not two alert targets are selected in step 535.

When two alert targets are not selected in step 535 (in other words, when one alert target is selected in step 535), the CPU makes a "No" determination in step 540, transitions to step 545, and displays the single display screen 400 (refer to FIG. 4A) that guides the line of sight of the driver in the direction of one alert target. Then, the CPU transitions to step 595 and temporarily finishes the present routine.

The single display screen 400 will be described in detail by using FIG. 4A. The display area of the display 20 is provided in an area in front of a driver seat on the windshield of the host vehicle. A center line of the display area is illustrated by a dot-dashed line in FIG. 4A (the same applies in FIG. 4B and FIG. 4C). While the center line is illustrated for convenience of description, the center line is not displayed in the actual display area. The center line of the display area corresponds to a right-left reference line LR (refer to FIG. 3) that extends forward in the vehicle front-rear direction from the position of the center of the vehicle in the vehicle width direction. An area on the left side of the center line of the display area corresponds to a left area LA (refer to FIG. 3) around the front of the host vehicle. An area on the right side of the center line of the display area corresponds to a right area RA (refer to FIG. 3) around the front of the host vehicle.

The sight guiding icon 401 that guides the line of sight of the driver in the direction of the alert target is displayed in the single display screen 400. The sight guiding icon 401 has a shape in which three arcs are linearly arranged. The sight guiding icon 401 is displayed in a range of ±90 deg in the right-left direction from a center of a predetermined position P0 on the center line of the display area. An arc of the three arcs that is more separated from the predetermined position P0 has a shorter length. The three arcs are lit in order from an arc closest to the position P0 (the same applies to other sight guiding icons). The sight guiding icon 401 can be displayed in angular units (12 deg) acquired by equally dividing, into 15 parts, the angular range (180 deg) from a line extending rightward from the position P0 among horizontal lines orthogonal with respect to the center line to a line extending leftward from the position P0 among the horizontal lines. While a position (axial line) in which the sight guiding icon 401 can be displayed is illustrated by a dotted line in FIG. 4A (also in FIG. 4B and FIG. 4C), the dotted line is not displayed in the actual display area.

Figure 4A:
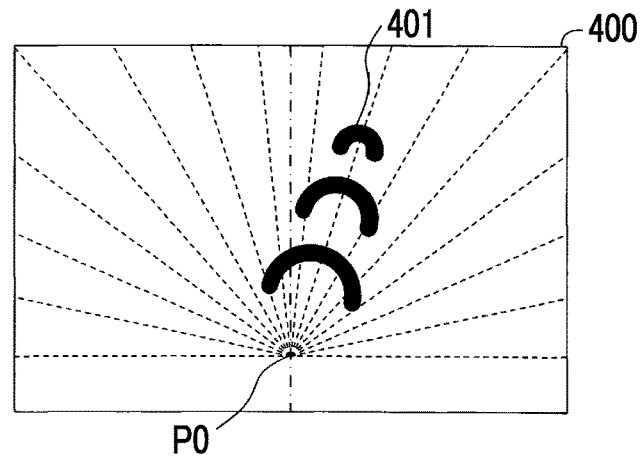
FIG. 4A is a descriptive diagram of a single display screen.

In the example illustrated in FIG. 4A, the sight guiding icon 401 indicates a direction at 18 deg rightward from the center line of the display area and indicates that an alert target exists to the direction. By guiding the line of sight of the driver to the direction in which the sight guiding icon 401 points, the driver is alerted to the alert target.

Description of the present routine continues from step 540 in FIG. 5. When two alert targets are selected in step 535, the CPU makes a "Yes" determination in step 540, transitions to step 550, and determines whether or not at least one alert target exists outside the field of view of the driver.

The process of step 550 will be described in detail by using FIG. 6. In step 550, the CPU calculates the magnitudes (for example, θa and θb) of angles between a field-of-view inside and outside determination reference line 51 and alert target direction lines. The field-of-view inside and outside determination reference line 51 extends forward in the front-rear axial direction of a host vehicle SV from a predetermined position Dp in the host vehicle SV. The alert target direction lines (for example, direction lines 52a, 52b) extend to the directions of the alert targets (for example, a and b) from the predetermined position Dp. The CPU determines whether or not there is at least one alert target having the calculated "magnitude of the angle" greater than or equal to a field-of-view inside and outside determination threshold.

The predetermined position Dp is the position of the center of the driver seat in the vehicle width direction. That is, the predetermined position Dp is the position of eyes of the driver when the driver sits on the driver seat. Specifically, the predetermined position Dp is a position between a backrest portion of the driver seat of the host vehicle SV and a steering wheel disposed in front of the backrest portion. The host vehicle SV illustrated in FIG. 6 is a vehicle in which the driver seat is disposed on the right side (right-hand drive car). The field of view of the driver on the right side is wider than the field of view of the driver on the left side in the right-hand drive car. Thus, a right-side field-of-view inside and outside determination threshold (θr>0) of the field-of-view inside and outside determination reference line 51 is set to a value greater than a left-side field-of-view inside and outside determination threshold (θl>0). In a vehicle in which the driver seat is disposed on the left side (left-hand drive car), the left-side field-of-view inside and outside determination threshold (θl) is set to a value greater than the right-side field-of-view inside and outside determination threshold (θr). The right-side field-of-view inside and outside determination threshold θr may be equal to the left-side field-of-view inside and outside determination threshold θl regardless of the position of the steering wheel. The predetermined position Dp may be the position of the center of a front end portion of the host vehicle SV in the vehicle width direction.

Figure 6:
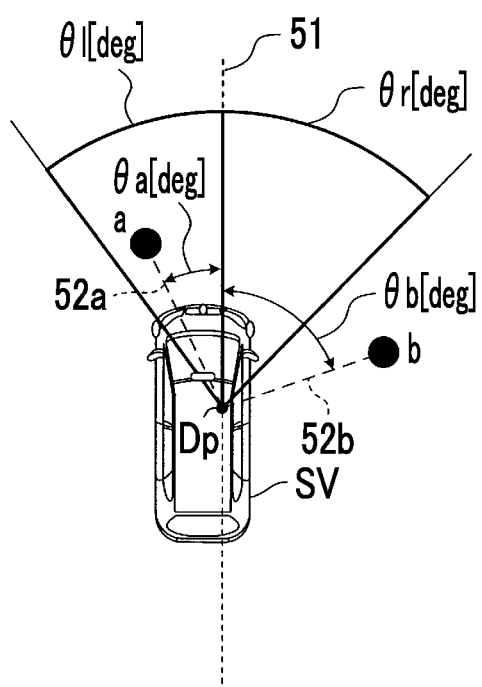
FIG. 6 is a diagram schematically illustrating a status of an alert target existing outside a field of view of a driver and an alert target existing within the field of view of the driver.

In the example illustrated in FIG. 6, a magnitude θa of the angle between the field-of-view inside and outside determination reference line 51 and the direction line 52a of an alert target a is less than the left-side field-of-view inside and outside determination threshold θl. Thus, the CPU determines that the alert target a exists within the field of view of the driver. A magnitude θb of the angle between the field-of-view inside and outside determination reference line 51 and the direction line 52b of an alert target b is greater than or equal to the right-side field-of-view inside and outside determination threshold θr. Accordingly, the CPU determines that the alert target b exists outside the field of view of the driver. Consequently, since at least one alert target b exists outside the field of view of the driver in the example illustrated in FIG. 6, the CPU makes a "Yes" determination in step 550.

When the host vehicle SV is turning, the CPU may set the field-of-view inside and outside determination reference line 51 as a line that is parallel to a tangent of the predicted traveling course in the current position of the host vehicle SV and passes through the predetermined position Dp. Accordingly, when the host vehicle SV is turning, the CPU can more accurately determine whether or not an alert target exists outside the field of view of the driver.

Description of the present routine continues from step 550 in FIG. 5. When any of the alert targets does not exist outside the field of view of the driver (in other words, when all of the two alert targets exist within the field of view of the driver), the CPU makes a "No" determination in step 550 and transitions to step 555. The CPU in step 555 displays the whole display screen 410 (refer to FIG. 4B) so as to guide the line of sight of the driver to the two alert targets, and then, transitions to step 595 and temporarily finishes the present routine.

The whole display screen 410 will be described by using FIG. 4B. The whole sight guiding icon 411 that guides the line of sight of the driver to the whole area in front of the host vehicle (when two alert targets are handled as one large target, guides the line of sight of the driver in the direction of the target) is displayed in the whole display screen 410. Like the sight guiding icon 401, the whole sight guiding icon 411 has a shape in which three arcs are linearly arranged, and an arc of the three arcs that is more separated from the predetermined position PO has a shorter length. However, the arcs of the whole sight guiding icon 411 extend across the whole area within the field of view of the driver and thus, are different from the sight guiding icon 401. Specifically, the arc of the whole sight guiding icon 411 that is the closest to the position PO extends from a direction Lm at 78 deg counterclockwise from the center line to a direction Rm at 78 deg clockwise from the center line. Accordingly, the line of sight of the driver is guided to the whole area within the field of view of the driver. Consequently, the line of sight of the driver is guided towards both (all) of the two alert targets existing within the field of view of the driver.

Description of the present routine continues from step 550 in FIG. 5. When at least one alert target exists outside the field of view of the driver, the CPU makes a "Yes" determination in step 550 and transitions to step 560. The CPU in step 560 guides the line of sight of the driver in the direction of each of the two alert targets. That is, the CPU displays the first individual display screen 420 (refer to FIG. 4C) on which the directions of the two alert targets are individually displayed, and then, transitions to step 595 and temporarily finishes the present routine. When the CPU makes a "Yes" determination in step 550, the number of alert targets is two, and at least one alert target exists outside the field of view of the driver.

The first individual display screen 420 will be described by using FIG. 4C. Two sight guiding icons 401 (a display element 401a and a display element 401b) that guide sight in the direction of each of the two alert targets are displayed in the first individual display screen 420. The first individual display screen 420 is displayed when the CPU in step 550 determines that at least one alert target exists outside the field of view of the driver. Accordingly, at least one sight guiding icon 401 of the first individual display screen 420 guides sight in the direction of the alert target existing outside the field of view of the driver. In the example in FIG. 4C, the left-side sight guiding icon 401a indicates a direction on the left side outside the field of view of the driver, and the right-side sight guiding icon 401b indicates a direction on the right side within the field of view of the driver. The line of sight of the driver is securely guided in the direction of the alert target existing on the left side outside the field of view of the driver by the left-side sight guiding icon 401a.

Figure 4B:
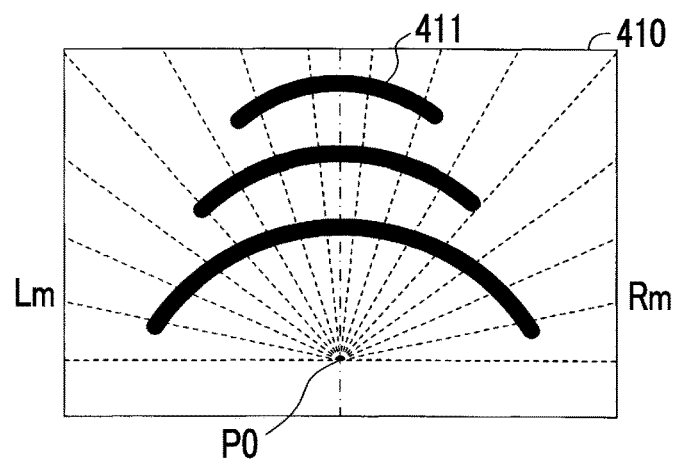
FIG. 4B is a descriptive diagram of a whole display screen.
Figure 4C:
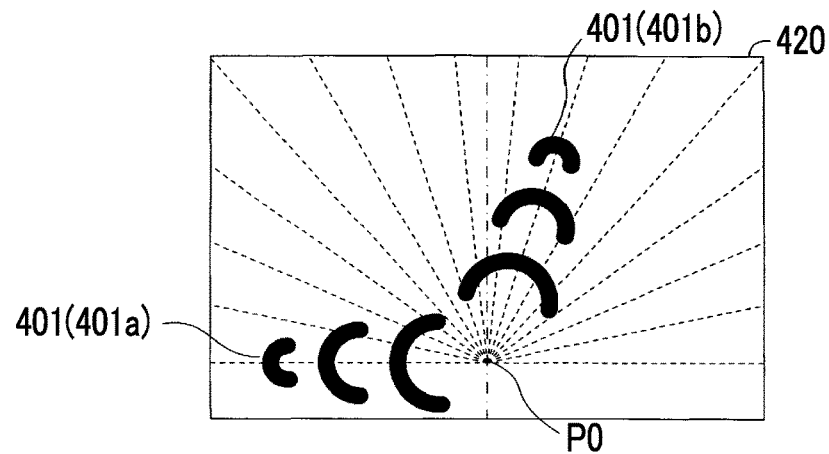
FIG. 4C is a descriptive diagram of a first individual display screen.

The example in FIG. 4C illustrates an example in which one alert target exists outside the field of view of the driver and the other alert target exists within the field of view of the driver. However, even when two alert targets exist outside the field of view of the driver and the two alert targets exist respectively on the left side and the right side, two sight guiding icons 401 that guide sight in the direction of each of the two alert targets existing outside the field of view of the driver are displayed in the first individual display screen 420.

In step 535, an obstacle having the shortest margin time period TTC and an obstacle having the second shortest margin time period TTC are selected as alert targets from the obstacles having the margin time period TTC shorter than the predetermined threshold T1th. Thus, when the obstacle having the shortest margin time period TTC or the obstacle having the second shortest margin time period TTC exists outside the field of view of the driver, the CPU in step 560 guides the line of sight of the driver in the direction of the obstacle having the shortest margin time period TTC by displaying the first individual display screen 420. Accordingly, when an obstacle having the highest alert degree or the second highest alert degree exists outside the field of view of the driver, the line of sight of the driver is securely guided in the direction of the obstacle.

Even when the alert target having the shortest margin time period TTC exists outside the field of view of the driver and the alert target having the second shortest margin time period TTC exists within the field of view of the driver, the CPU displays the first individual display screen 420. As illustrated in FIG. 4C, the sight guiding icon 401a that guides the line of sight of the driver in the direction of the alert target existing outside the field of view of the driver, and the sight guiding icon 401b that guides the line of sight of the driver in the direction of the alert target existing within the field of view of the driver are displayed in the first individual display screen 420. Accordingly, the line of sight of the driver can be guided to the alert target existing outside the field of view of the driver and the alert target existing within the field of view of the driver.

Next, a positional relationship between the host vehicle and an alert target when the alert screen is displayed will be described by using examples.

Figure 7A:
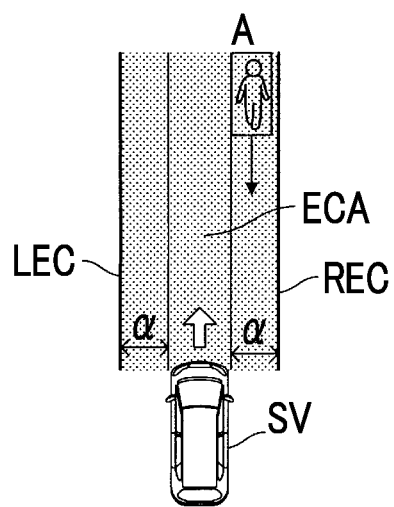
FIG. 7A is a diagram illustrating one example of a positional relationship between a host vehicle and an alert target when the single display screen is displayed.

FIG. 7A illustrates one example of a positional relationship between the host vehicle SV and an alert target when the single display screen 400 is displayed. In such a case, a pedestrian A exists within the predicted traveling course area ECA between the right-side predicted traveling course REC through which a point positioned on the right side at the certain distance α from the right end portion of the vehicle body of the host vehicle SV passes, and the left-side predicted traveling course LEC through which a point positioned on the left side at the certain distance α from the left end portion of the vehicle body of the host vehicle SV passes. The margin time period TTC of the pedestrian A (the time period before the pedestrian A approaches the closest point to the host vehicle SV) is assumed to be shorter than the threshold T1th. Objects other than the pedestrian A are not detected in the example. Accordingly, the pedestrian A is recognized as an alert target. In such a case, since the number of alert targets is one, the CPU makes a "No" determination in step 540 and transitions to step 545. In step 545, the CPU displays the single display screen 400 (refer to FIG. 4A) including the sight guiding icon 401 that indicates the direction of the pedestrian A.

Figure 7B:
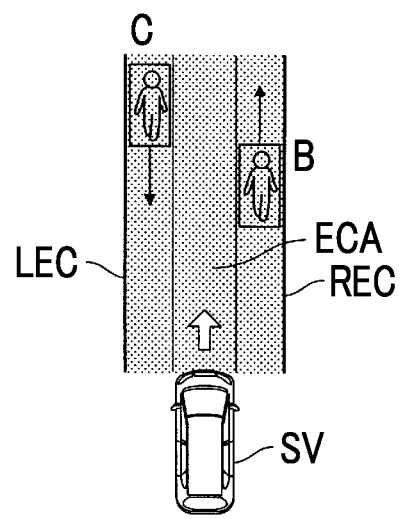
FIG. 7B is a diagram illustrating one example of a positional relationship between the host vehicle and alert targets when the whole display screen is displayed.

FIG. 7B illustrates one example of a positional relationship between the host vehicle SV and alert targets when the whole display screen 410 is displayed. In such a case, a pedestrian B and a pedestrian C exist within the predicted traveling course area ECA. Any of the margin time period TTC of the pedestrian B and the margin time period TTC of the pedestrian C is assumed to be shorter than the threshold T1th. The margin time period TTC of the pedestrian B is assumed to be the shortest, and the margin time period TTC of the pedestrian C is assumed to be the second shortest after the pedestrian B. Accordingly, the pedestrian B and the pedestrian C are recognized as alert targets. Any of the pedestrian B and the pedestrian C is assumed to exist within the field of view of the driver. In such a case, since the number of alert targets is two and any of the alert targets does not exist outside the field of view of the driver, the CPU makes a "Yes" determination in step 540, makes a "No" determination in step 550, and transitions to step 555. In step 555, the CPU displays the whole display screen 410 (refer to FIG. 4B) including the whole sight guiding icon 411.

Figure 7C:
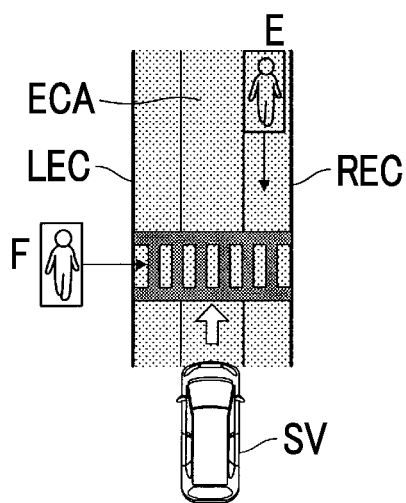
FIG. 7C is a diagram illustrating one example of a positional relationship between the host vehicle and alert targets when the individual display screen is displayed.

FIG. 7C illustrates one example of a positional relationship between the host vehicle SV and alert targets when the first individual display screen 420 is displayed. In such a case, a pedestrian E exists within the predicted traveling course area ECA. The margin time period TTC of the pedestrian E is assumed to be shorter than the threshold T1th. A pedestrian F does not exist within the predicted traveling course area ECA and is entering the predicted traveling course area ECA. The margin time period TTC of the pedestrian F (the predicted time period before entering the predicted traveling course area ECA) is assumed to be shorter than the threshold T1th. The margin time period TTC of the pedestrian F is assumed to be the shortest, and the margin time period TTC of the pedestrian E is assumed to be the second shortest. Accordingly, the pedestrian E and the pedestrian F are recognized as alert targets. In the example, the pedestrian E is assumed to exist within the field of view of the driver, and the pedestrian F is assumed to exist outside the field of view of the driver. In such a case, since the number of alert targets is two and at least one alert target exists outside the field of view of the driver, the CPU makes a "Yes" determination in step 540, makes a "Yes" determination in step 550, and transitions to step 560. In step 560, the CPU displays the first individual display screen 420 (refer to FIG. 4C) including the sight guiding icon 401b that indicates the direction of the pedestrian E, and the sight guiding icon 401a that indicates the direction of the pedestrian F.

As described heretofore, when the number of alert targets is two and any of the alert targets does not exist outside the field of view of the driver, the first apparatus displays the whole display screen 410 including the whole sight guiding icon 411 that indicates the whole area in front of the host vehicle. Accordingly, the "possibility of confusing the driver by guiding the line of sight of the driver to a plurality of directions due to display of a plurality of sight guiding icons 401 when alert targets do not exist outside the field of view of the driver" can be further decreased.

When the number of alert targets is two and at least one alert target exists outside the field of view of the driver, the first apparatus displays the first individual display screen 420 including at least the sight guiding icon 401a that indicates the direction of the alert target existing outside the field of view of the driver. Accordingly, even when a plurality of alert targets exists, the line of sight of the driver can be more securely guided in the direction of the alert target existing outside the field of view of the driver. Therefore, the first apparatus can appropriately provide alert for the alert targets and particularly, can appropriately provide alert for the alert target existing outside the field of view of the driver.

An obstacle having the shortest margin time period TTC and an obstacle having the second shortest margin time period TTC are selected as alert targets. Thus, when the obstacle having the shortest or second shortest margin time period TTC exists outside the field of view of the driver, the first individual display screen 420 is displayed. Accordingly, when an obstacle having a comparatively high alert degree exists outside the field of view of the driver, the line of sight of the driver can be securely guided in the direction of the obstacle.

First Modification Example of First Apparatus

A first modification example of the first apparatus is different from the first apparatus in that the first modification example displays a second individual display screen 430 (refer to FIG. 8) when one alert target (that is, one of an obstacle having the shortest margin time period TTC and an obstacle having the second shortest margin time period TTC) exists outside the field of view of the driver, and the other alert target (that is, the other of the obstacle having the shortest margin time period TTC and the obstacle having the second shortest margin time period TTC) and an obstacle having the third shortest margin time period TTC exist within the field of view of the driver. The sight guiding icon 401 that guides sight in the direction of the alert target existing outside the field of view of the driver, and the whole sight guiding icon 411 are displayed in the second individual display screen 430. Hereinafter, the difference will be mainly described.

Figure 9:
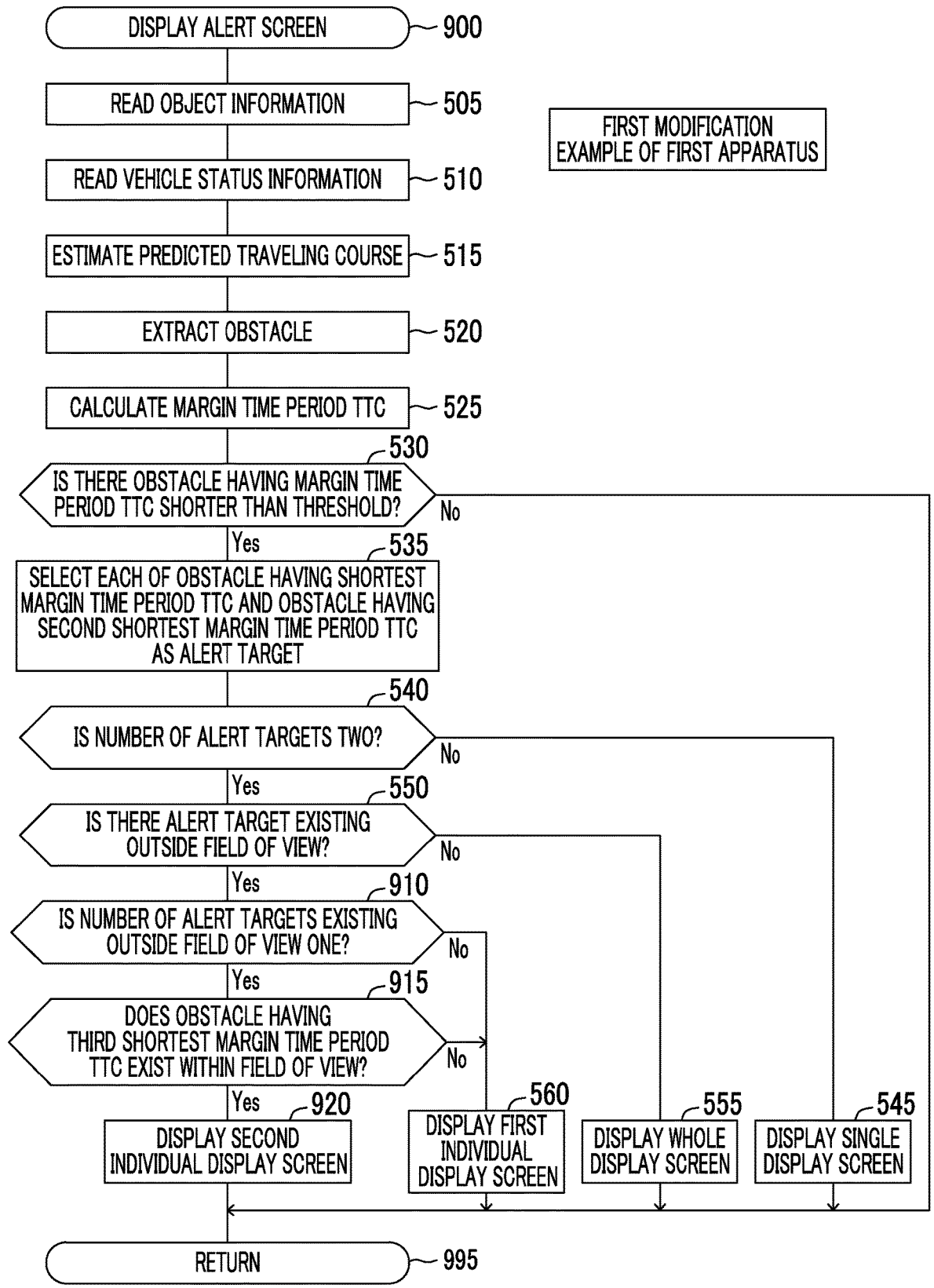
FIG. 9 is a flowchart illustrating a routine executed by a CPU of an in-vehicle alert apparatus according to the first modification example of the first embodiment of the present disclosure.

Each time a predetermined time period elapses, the CPU of the modification example executes a routine illustrated in a flowchart in FIG. 9 instead of the routine illustrated in the flowchart in FIG. 5. The routine in FIG. 9 is a routine that displays the alert screen on the display 20. Among steps illustrated in FIG. 9, steps in which the same processes as the steps illustrated in FIG. 5 are performed will be designated by the same reference signs as the steps in FIG. 5. The steps will not be described in detail.

When the CPU in step 550 makes a "Yes" determination, that is, when at least one alert target (that is, at least one of an obstacle having the shortest margin time period TTC and an obstacle having the second shortest margin time period TTC) exists outside the field of view of the driver, the CPU transitions to step 910 and determines whether or not the number of alert targets existing outside the field of view of the driver is one.

When the number of alert targets existing outside the field of view of the driver is not one (in other words, when two alert targets exist outside the field of view of the driver), the CPU makes a "No" determination in step 910, transitions to step 560, and displays the first individual display screen 420 that guides the line of sight of the driver in the direction of each of the two alert targets existing outside the field of view of the driver. The CPU transitions to step 995 and temporarily finishes the present routine. When two alert targets existing outside the field of view of the driver are either on the left side or the right side, one sight guiding icon 401 (401a) that indicates the side on which the two alert target exist is displayed. When two alert targets existing outside the field of view of the driver are respectively on the left side and the right side, two sight guiding icons 401 (401a) that respectively point to the two alert targets are displayed.

When a "No" determination is made in step 910, two alert targets exist outside the field of view of the driver. The reason will be described below. Two alert targets exist since a "Yes" determination is made in step 540. At least one alert target exists outside the field of view of the driver since a "Yes" determination is made in step 550. Thus, when the CPU in step 910 determines that the number of alert targets existing outside the field of view of the driver is not one, two alert targets exist outside the field of view of the driver.

When the number of alert targets existing outside the field of view of the driver is one, the CPU makes a "Yes" determination in step 910, transitions to step 915, and executes the following processes.

The CPU selects an obstacle having the third shortest margin time period TTC from the obstacles having the margin time period TTC shorter than the predetermined threshold T1th. That is, the CPU excludes the "target selected as an alert target by the process of step 535" from the obstacles having the margin time period TTC shorter than the predetermined threshold T1th, extracts obstacles having the margin time period TTC shorter than the threshold T1th from the remaining obstacles, and selects an obstacle having the shortest margin time period TTC from the extracted obstacles.

The CPU determines whether or not the obstacle having the third shortest margin time period TTC exists within the field of view of the driver.

Figure 8:
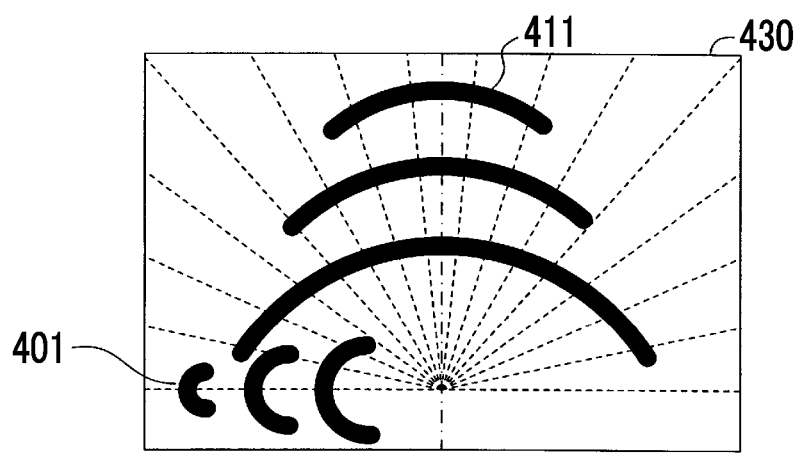
FIG. 8 is a descriptive diagram of a second individual display screen according to a first modification example of the first embodiment of the present disclosure.

When the obstacle having the margin time period TTC shorter than the predetermined threshold T1th and having the third shortest margin time period TTC exists within the field of view of the driver, the CPU makes a "Yes" determination in step 915, transitions to step 920, and displays the second individual display screen 430 (refer to FIG. 8). The CPU transitions to step 995 and temporarily finishes the present routine. The second individual display screen 430 is displayed when one alert target exists outside the field of view of the driver, and the other alert target and the obstacle having the third shortest margin time period TTC exist within the field of view of the driver.

As illustrated in FIG. 8, the sight guiding icon 401 that guides sight in the direction of the alert target existing outside the field of view of the driver is displayed in the second individual display screen 430. The whole sight guiding icon 411 is also displayed in the second individual display screen 430 since the other alert target and the obstacle having the third shortest margin time period TTC exist within the field of view of the driver.

As described above, the second individual display screen 430 is a screen on which the sight guiding icon 401 and the whole sight guiding icon 411 are individually displayed so as to guide sight in the direction of the alert target existing outside the field of view of the driver when two alert targets are detected. The first individual display screen 420 is also a screen on which two sight guiding icons 401 are individually displayed so as to guide sight in the direction of the alert target existing outside the field of view of the driver. Accordingly, at least the sight guiding icon 401 that guides sight in the direction of the alert target existing outside the field of view of the driver is displayed in the first individual display screen 420 and the second individual display screen 430. Thus, when the second individual display screen 430 is displayed, the line of sight of the driver is securely guided in at least the "direction of the alert target existing outside the field of view of the driver" in the same manner as the first individual display screen 420.

When the obstacle having the margin time period TTC shorter than the predetermined threshold T1th and having the third shortest margin time period TTC does not exist within the field of view of the driver (in other words, when the obstacle having the third shortest margin time period TTC exists outside the field of view of the driver), the CPU makes a "No" determination in step 915. The CPU transitions to step 560 and displays the first individual display screen 420. The CPU transitions to step 995 and temporarily finishes the present routine.

When an obstacle having the third shortest margin time period TTC does not exist, that is, when a single obstacle having the margin time period TTC shorter than the predetermined threshold T1th is selected as an alert target, the CPU in step 915 cannot select an obstacle having the third shortest margin time period TTC. In such a case as well, the CPU makes a "No" determination in step 915, transitions to step 560, and displays the first individual display screen 420.

Next, a positional relationship between the host vehicle and alert targets when the second individual display screen 430 is displayed will be described by using an example.

Figure 10:
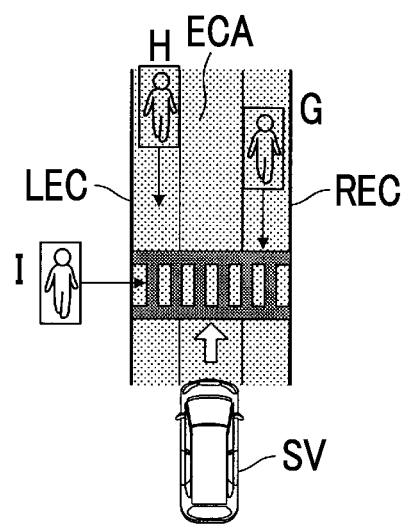
FIG. 10 is a diagram illustrating one example of a positional relationship between the host vehicle and the alert target when the second individual display screen is displayed.

FIG. 10 illustrates one example of a positional relationship between the host vehicle SV and alert targets when the second individual display screen 430 is displayed. In such a case, a pedestrian G and a pedestrian H exist within the predicted traveling course area ECA. The margin time period TTC of each of the pedestrian G and the pedestrian H is assumed to be shorter than the threshold T1th. A pedestrian I does not exist within the predicted traveling course area ECA and is entering the predicted traveling course area ECA. The margin time period TTC of the pedestrian I (the predicted time period before entering the predicted traveling course area ECA) is assumed to be shorter than the threshold T1th. The margin time period TTC of the pedestrian I is assumed to be the shortest. The margin time period TTC of the pedestrian G is assumed to be the second shortest. The margin time period TTC of the pedestrian H is assumed to be the third shortest. Accordingly, the pedestrian G and the pedestrian I are recognized as alert targets. In the example, the pedestrian G and the pedestrian H are assumed to exist within the field of view of the driver, and the pedestrian I is assumed to exist outside the field of view of the driver. In such a case, since the number of alert targets is two (the pedestrian I and the pedestrian G) and at least one alert target (pedestrian I) exists outside the field of view of the driver, the CPU makes a "Yes" determination in step 540, makes a "Yes" determination in step 550, and transitions to step 910. When the number of alert targets existing outside the field of view of the driver is one which is the pedestrian I, the CPU makes a "Yes" determination in step 910 and transitions to step 915.

The margin time period TTC of the pedestrian H is shorter than the predetermined threshold T1th, and the margin time period TTC is the third shortest. The pedestrian H exists within the field of view of the driver. Thus, the CPU makes a "Yes" determination in step 915 and transitions to step 920. In step 920, the CPU displays the second individual display screen 430 including the sight guiding icon 401 that indicates the direction of the pedestrian I, and the whole sight guiding icon 411 that collectively indicates the directions of the pedestrian G and the pedestrian H.

When the CPU makes a "Yes" determination in both of step 540 and step 550 and makes a "No" determination in step 910, the CPU determines that the alert target having the second shortest margin time period TTC exists outside the field of view of the driver. In such a case, the CPU transitions to step 560 and displays the first individual display screen 420 that guides the line of sight of the driver in the direction of each of the two alert targets existing outside the field of view of the driver. Thus, the line of sight of the driver is securely guided to the "alert target having the second shortest margin time period TTC" that exists outside the field of view of the driver.

Even when a "Yes" determination is made in step 910, the second individual display screen 430 (refer to step 920) and the first individual display screen 420 (refer to step 560) are displayed consequently. In the display of the first individual display screen 420 and the second individual display screen 430, the sight guiding icon 401 (401a) that is directed toward the alert target existing outside the field of view of the driver is displayed. Thus, when the alert target having the second shortest margin time period TTC exists outside the field of view of the driver, the line of sight of the driver is securely guided to the "alert target having the second shortest margin time period TTC" that exists outside the field of view of the driver.

Second Modification Example of First Apparatus

Figure 11:
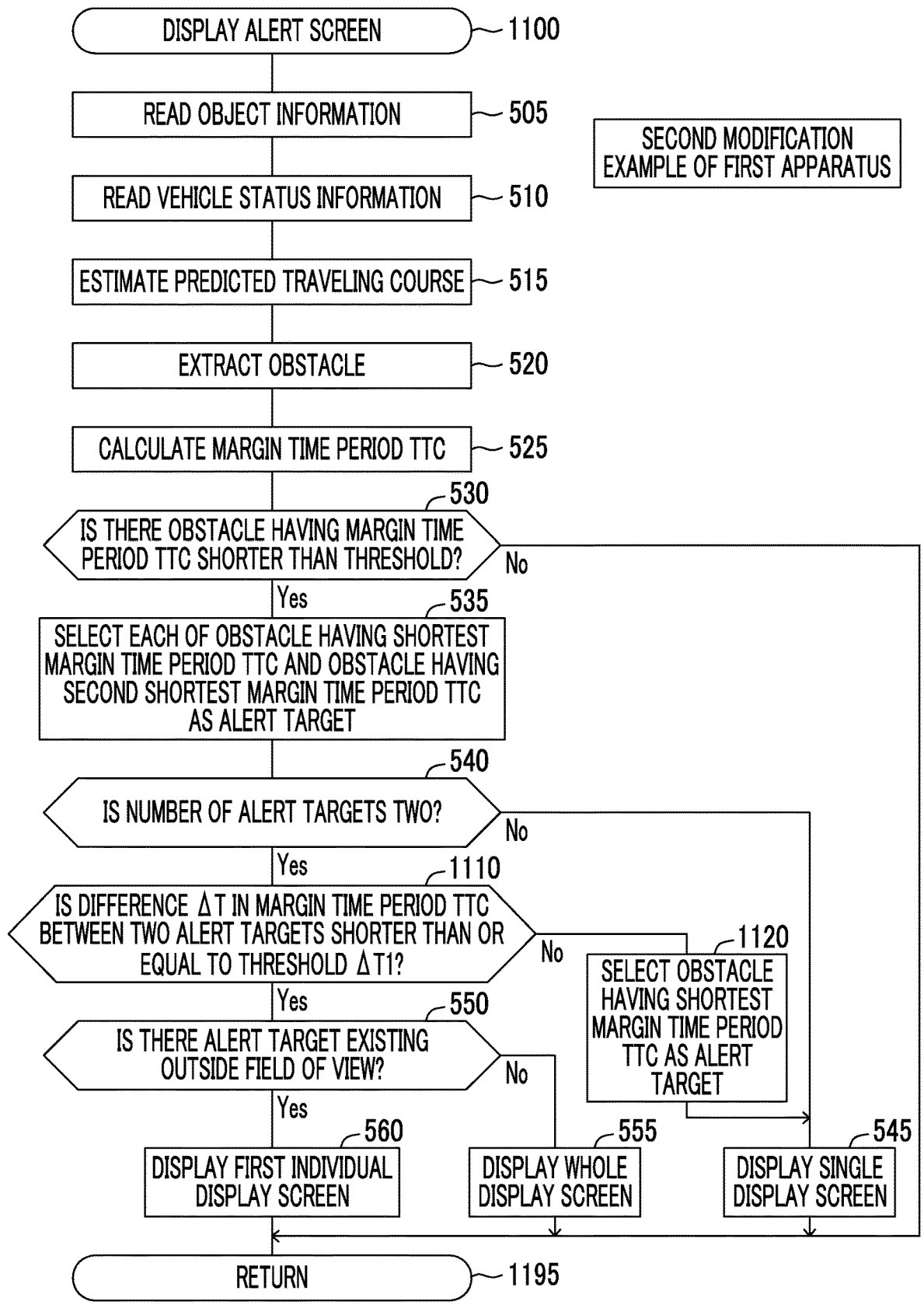
FIG. 11 is a flowchart illustrating a routine executed by a CPU of an in-vehicle alert apparatus according to a second modification example of the first embodiment of the present disclosure.

Next, a second modification example of the first apparatus will be described. The CPU of the modification example executes a routine illustrated in a flowchart in FIG. 11 instead of FIG. 5. The routine in FIG. 11 is different from the routine in FIG. 5 in that step 1110 is added between step 540 and step 550, and that the CPU is configured to transition to step 545 through step 1120 when a "No" determination is made in step 1110. Accordingly, hereinafter, the difference will be mainly described.

When the CPU in step 540 determines that two alert targets are selected in step 535, the CPU transitions to step 1110 from step 540. In step 1110, the CPU determines whether or not a magnitude ΔT of the difference in margin time period TTC between the two alert targets (hereinafter, referred to as a "margin time period difference ΔT") is shorter than or equal to a threshold ΔT1.

When the margin time period difference ΔT is shorter than or equal to the threshold ΔT1, two alert targets have equal alert degrees, and it is desirable to provide alert for the two alert targets. Therefore, in such a case, the CPU makes a "Yes" determination in step 1110 and transitions to step 550. Consequently, when there is no alert target existing outside the field of view of the driver, the CPU transitions to step 555 and displays the whole display screen 410 (refer to FIG. 4B). When there is an alert target existing outside the field of view of the driver, the CPU transitions to step 560 and displays the first individual display screen 420 (refer to FIG. 4C).

When the CPU, at the point in time of executing the process of step 1110, determines that the margin time period difference ΔT is longer than the threshold ΔT1, the line of sight of the driver has to be securely guided in the direction of an alert target having the shorter margin time period TTC. Thus, the CPU makes a "No" determination in step 1110, transitions to step 1120, and again selects an obstacle having the shortest margin time period TTC as an alert target. Then, the CPU transitions to step 545 and displays the single display screen 400 (refer to FIG. 4A) including the sight guiding icon 401 that indicates the direction of the alert target. Consequently, the single display screen 400 including the sight guiding icon 401 that indicates the direction of the alert target having the shortest margin time period TTC is displayed. Then, the CPU transitions to step 1195 and temporarily finishes the present routine.

As described heretofore, when the margin time period difference ΔT between two alert targets is longer than the threshold ΔT1, the modification example guides the line of sight of the driver in the direction of the alert target having the shortest margin time period TTC. Accordingly, the line of sight of the driver can be securely guided in the direction of the alert target having the shortest margin time period TTC.

Second Embodiment

Next, an in-vehicle alert apparatus according to a second embodiment of the present disclosure (hereinafter, referred to as a "second apparatus") will be described. The main difference between the second apparatus and the first apparatus is as follows. That is, as illustrated in FIG. 3, the second apparatus divides the area around the front of the host vehicle into the left area LA and the right area RA. The left area LA is an area on the left side of the right-left reference line LR that extends forward in the front-rear direction from the position of the center of the host vehicle in the vehicle width direction. The right area RA is an area on the right side of the right-left reference line LR. The second apparatus selects an obstacle having the shortest margin time period TTC among obstacles existing within the left area LA as an alert target for the left area LA. The second apparatus selects an obstacle having the shortest margin time period TTC among obstacles existing within the right area RA as an alert target for the right area RA. The second apparatus appropriately provides alert for the selected alert targets. Hereinafter, the difference will be mainly described. The left area LA will be referred to as a "first area" for convenience, and the right area RA will be referred to as a "second area" for convenience.

Figure 12:
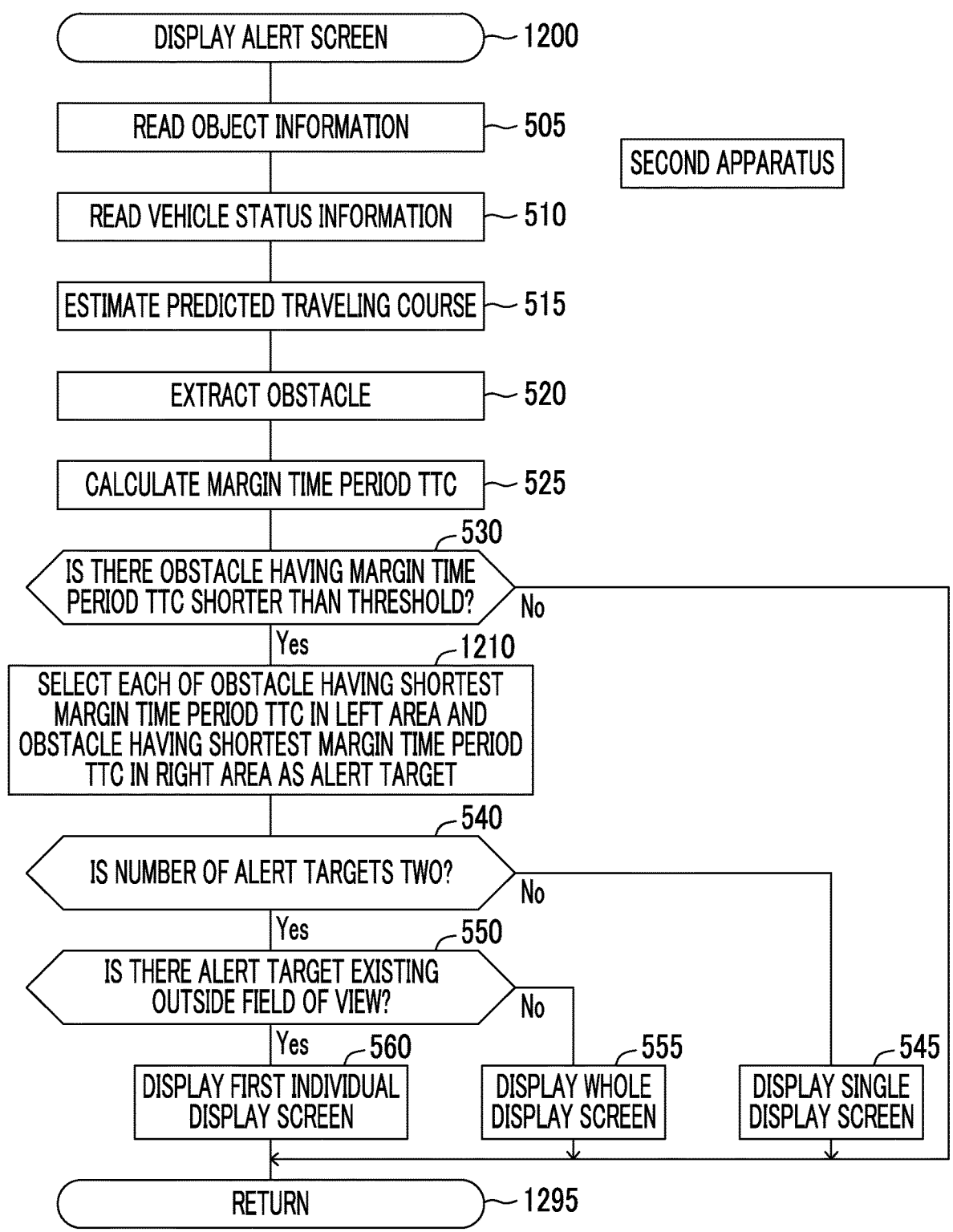
FIG. 12 is a flowchart illustrating a routine executed by a CPU of an in-vehicle alert apparatus according to a second embodiment of the present disclosure.

The CPU of the second embodiment executes a routine illustrated in a flowchart illustrated in FIG. 12 each time a predetermined time period elapses. The routine in FIG. 12 is a routine that displays the alert screen on the display 20. Among steps illustrated in FIG. 12, steps in which the same processes as the steps illustrated in FIG. 5 are performed will be designated by the same reference signs as the steps in FIG. 5. The steps will not be described in detail.

The CPU transitions to step 530 after executing the processes of step 505 to step 525 and determines whether or not the margin time period TTC of each obstacle extracted in step 520 is shorter than the predetermined threshold T1th. The CPU in step 530 also determines whether or not at least one alert target exists.

When an alert target does not exist, the alert screen does not have to be displayed. In such a case, the CPU makes a "No" determination in step 530, transitions to step 1295, and temporarily finishes the present routine. Consequently, the alert screen is not displayed.

When the CPU determines that an alert target exists, the CPU makes a "Yes" determination in step 530 and transitions to step 1210. In step 1210, the CPU selects an obstacle having the margin time period TTC shorter than the predetermined threshold T1th and having the shortest margin time period TTC as an alert target from obstacles existing in the left area LA. The CPU selects an obstacle having the margin time period TTC shorter than the predetermined threshold T1th and having the shortest margin time period TTC as an alert target from obstacles existing in the right area RA.

At least one obstacle having the margin time period TTC shorter than the predetermined threshold T1th exists since a "Yes" determination is made in step 530. However, when the number of obstacles having the margin time period TTC shorter than the predetermined threshold T1th is one, the CPU in step 1210 can select an alert target in one area of the left area LA and the right area RA and cannot select an alert target in the other area. Thus, the CPU may select one alert target in step 1210.

Next, the CPU transitions to step 540 and determines whether or not two alert targets are selected in step 1210.

When two alert targets are not selected in step 1210, that is, when an alert target exists in one area of the left area LA and the right area RA and an alert target does not exist in the other area, the CPU makes a "No" determination in step 540. The CPU transitions to step 545 and displays the single display screen 400 (refer to FIG. 4A). The CPU transitions to step 1295 and temporarily finishes the present routine.

A plurality of obstacles having the margin time period TTC shorter than the threshold T1th may exist in one area of both of the left area LA and the right area RA. When a plurality of sight guiding icons 401 that indicates the direction of each of the obstacles is displayed, the line of sight of the driver is guided to the plurality of directions, and the driver may be confused. The process of step 1210 selects one alert target at a time in each of the left area LA and the right area RA. Thus, in the single display screen 400 displayed in step 545, one sight guiding icon 401 is displayed for the left area LA, and one sight guiding icon 401 is displayed for the right area RA. Accordingly, displaying a plurality of sight guiding icons 401 can be prevented in each of the left area LA and the right area RA. The line of sight of the driver can be guided to an estimated alert target for which alert has to be provided preferentially in each of the left area LA and the right area RA. Thus, the driver can be appropriately alerted.

When two alert targets are selected in step 1210, that is, when an alert target exists in each of both areas of the left area LA and the right area RA, the CPU makes a "Yes" determination in step 540 and transitions to step 550. In step 550, the CPU determines whether or not at least one alert target exists outside the field of view of the driver.

When any of the two alert targets does not exist outside the field of view of the driver (in other words, when all of the two alert targets exist within the field of view of the driver), the CPU makes a "No" determination in step 550, transitions to step 555, and displays the whole display screen 410 (refer to FIG. 4B). Consequently, the line of sight of the driver is guided to the whole area in front of the host vehicle SV (that is, both areas of the left area LA and the right area RA). The CPU transitions to step 1295 and temporarily finishes the present routine.

When at least one of the two alert targets exists outside the field of view of the driver, the CPU makes a "Yes" determination in step 550 and transitions to step 560. The CPU in step 560 displays the first individual display screen 420 (refer to FIG. 4C) including the sight guiding icon 401 that indicates the direction of the alert target in the left area, and the sight guiding icon 401 that indicates the direction of the alert target in the right area. Accordingly, even when any of the alert target in the left area and the alert target in the right area exists outside of the field of view of the driver, the sight guiding icon 401 that guides sight to the alert target existing outside the field of view of the driver is displayed. The CPU transitions to step 1295 and temporarily finishes the present routine.

The single display screen 400 displayed by the process of step 545 of the present embodiment includes one sight guiding icon 401. The first individual display screen 420 displayed by the process of step 560 of the present embodiment includes the sight guiding icon 401 that indicates the direction of the alert target having the shortest margin time period TTC in the left area LA, and the sight guiding icon 401 that indicates the direction of the alert target having the shortest margin time period TTC in the right area RA. That is, the maximum number of sight guiding icons 401 displayed in each of the left area LA and the right area RA is one in the single display screen 400 and the first individual display screen 420 of the present embodiment. Accordingly, a "situation in which the driver is confused due to a plurality of sight guiding icons 401 displayed in one area (each of the left area LA and the right area RA)" can be prevented. The sight guiding icon 401 displayed in one area indicates the direction of the obstacle having the shortest margin time period TTC in the area. Thus, the line of sight of the driver can be guided in the direction of the obstacle for which alert has to be provided preferentially.

First Modification Example of Second Apparatus

Next, a first modification example of the second apparatus will be described. The modification example is different from the second apparatus in that the modification example displays the second individual display screen 430 (refer to FIG. 8). Hereinafter, the difference will be mainly described. The modification example corresponds to the first modification example of the first apparatus.

Figure 13:
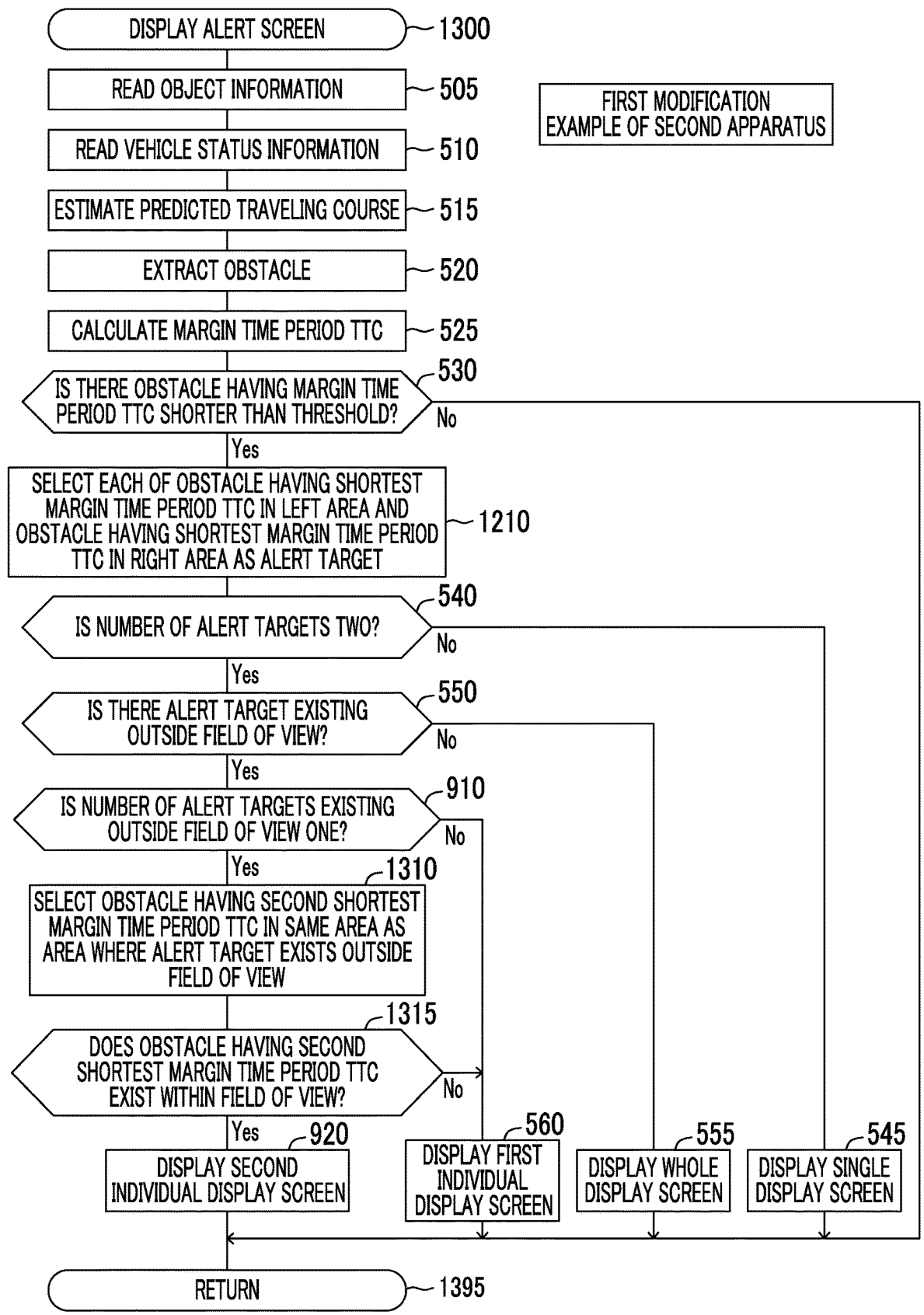
FIG. 13 is a flowchart illustrating a routine executed by a CPU of an in-vehicle alert apparatus according to a first modification example of the second embodiment of the present disclosure.

Each time a predetermined time period elapses, the CPU of the modification example executes a routine illustrated in a flowchart in FIG. 13 instead of the routine illustrated in the flowchart in FIG. 12. The routine in FIG. 13 is a routine that displays the alert screen on the display 20. Among steps illustrated in FIG. 13, steps in which the same processes as the steps illustrated in FIG. 9 and FIG. 12 are performed will be designated by the same reference signs as the steps in FIG. 9 and FIG. 12. The steps will not be described in detail.

When the CPU makes a "Yes" determination in step 550, the CPU transitions to step 910 and determines whether or not the number of alert targets existing outside the field of view of the driver is one.

When the number of alert targets existing outside the field of view of the driver is not one (in other words, when both an alert target existing in the left area LA and an alert target existing in the right area RA exist outside the field of view of the driver), the CPU makes a "No" determination in step 910, transitions to step 560, and displays the first individual display screen 420. The CPU transitions to step 1395 and temporarily finishes the present routine.

When the number of alert targets existing outside the field of view of the driver is one, the CPU makes a "Yes" determination in step 910 and transitions to step 1310. The CPU in step 1310 selects an obstacle satisfying the following condition from obstacles existing in the same area as an area, of the left area LA and the right area RA, in which the alert target exists outside the field of view of the driver. The condition is that the selected obstacle has the margin time period TTC shorter than the predetermined threshold T1th and has the second shortest margin time period TTC.

Accordingly, the CPU selects an obstacle having the shortest margin time period TTC after the alert target existing outside the field of view of the driver, from obstacles that exist in the same area as the alert target existing outside the field of view of the driver and have the margin time period TTC shorter than the predetermined threshold T1th.

When an obstacle having the margin time period TTC shorter than the predetermined threshold T1th does not exist except for the alert target in the area, of the left area LA and the right area RA, where the alert target exists outside the field of view of the driver, the CPU does not select an obstacle in step 1310.

Next, the CPU transitions to step 1315 and determines whether or not the obstacle selected in step 1310 exists within the field of view of the driver.

When the obstacle selected in step 1310 exists within the field of view of the driver, the CPU makes a "Yes" determination in step 1315, transitions to step 920, and displays the second individual display screen 430 (refer to FIG. 8). The CPU transitions to step 1395 and temporarily finishes the present routine.

In such a case, the number of alert targets existing outside the field of view of the driver is one since a "Yes" determination is made in step 910. Accordingly, an alert target exists within the field of view of the driver in an area, of the left area LA and the right area RA, which is different from the area in which the alert target exists outside the field of view of the driver. Since a "Yes" determination is made in step 1315, an obstacle that has the margin time period TTC shorter than the predetermined threshold T1th and has the shortest margin time period TTC after the alert target existing outside the field of view of the driver exists within the field of view of the driver in the area, of the left area LA and the right area RA, where the alert target exists outside the field of view of the driver. Accordingly, when a "Yes" determination is made in step 1315, one alert target exists outside the field of view of the driver in any one area of the left area LA and the right area RA, and an obstacle having the margin time period TTC shorter than the predetermined threshold T1th exists within the field of view of the driver in each of both areas of the left area LA and the right area RA. Thus, the CPU in step 920 displays the second individual display screen 430 including the whole sight guiding icon 411 and the sight guiding icon 401 that guides sight in the direction of the alert target existing outside the field of view of the driver.

When the obstacle selected in step 1310 does not exist within the field of view of the driver, the CPU makes a "No" determination in step 1315, transitions to step 560, and displays the first individual display screen 420 (refer to FIG. 4C). The CPU transitions to step 1395 and temporarily finishes the present routine. In such a case, the obstacle selected in step 1210 also exists outside the field of view of the driver in the area where the alert target exists outside the field of view of the driver. Therefore, the CPU displays the first individual display screen 420. The first individual display screen 420 has one sight guiding icon 401 that indicates the direction of the alert target existing outside the field of view of the driver in the left area LA, and one sight guiding icon 401 that indicates the direction of the alert target existing outside the field of view of the driver in the right area RA. That is, when the obstacle selected in step 1210 also exists outside the field of view of the driver in an area where the alert target exists outside the field of view of the driver, the CPU displays one sight guiding icon 401 that indicates the direction of the alert target existing outside the field of view of the driver in the area. Accordingly, a "situation in which the driver is confused due to a plurality of sight guiding icons 401 displayed in one area (each of the left area LA and the right area RA)" can be prevented.

When an obstacle is not selected in step 1310, the CPU makes a "No" determination in step 1315 and transitions to step 560.

Second Modification Example of Second Apparatus

Figure 14:
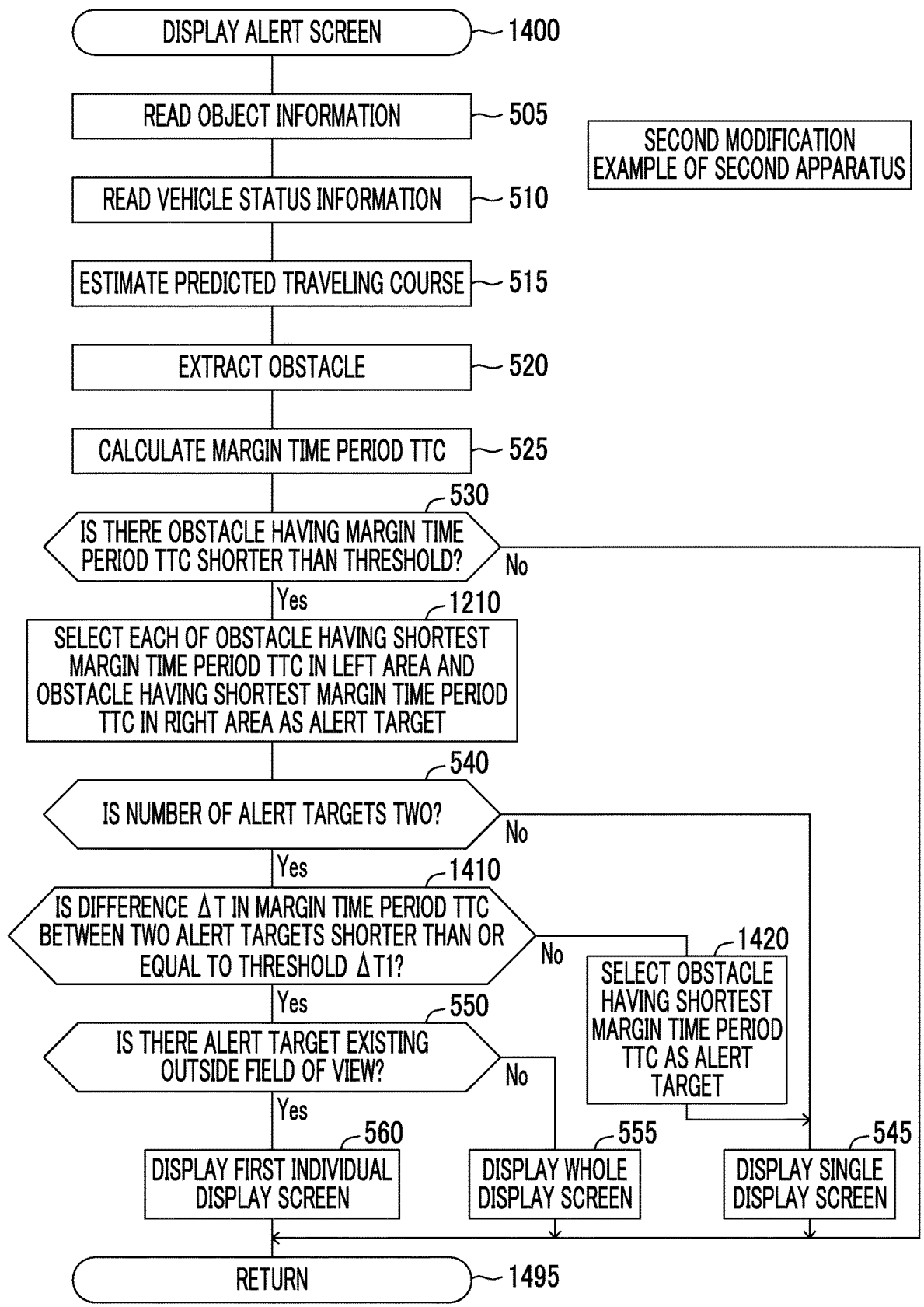
FIG. 14 is a flowchart illustrating a routine executed by a CPU of an in-vehicle alert apparatus according to a second modification example of the second embodiment of the present disclosure.

Next, a second modification example of the second apparatus will be described. The modification example corresponds to the second modification example of the first apparatus. The CPU of the modification example executes a routine illustrated in a flowchart in FIG. 14 instead of FIG. 12 each time a predetermined time period elapses. The routine in FIG. 14 is a routine that displays the alert screen on the display 20, and is different from the routine in FIG. 12 in that step 1410 is added between step 540 and step 550, and that the CPU transitions to step 545 through step 1420 when a "No" determination is made in step 1410. Accordingly, hereinafter, the difference will be mainly described.

When the CPU in step 540 determines that two alert targets are selected in step 1210, the CPU transitions to step 1410 from step 540. Step 1410 is a process corresponding to step 1110 illustrated in FIG. 11. In step 1410, the CPU determines whether or not the margin time period difference ΔT is shorter than or equal to the threshold ΔT1.

When the margin time period difference ΔT is shorter than or equal to the threshold ΔT1, two alert targets have equal alert degrees, and it is desirable to provide alert for the two alert targets. Therefore, in such a case, the CPU makes a "Yes" determination in step 1410 and transitions to step 550. Consequently, when there is no alert target existing outside the field of view of the driver, the CPU transitions to step 555 and displays the whole display screen 410 (refer to FIG. 4B). When there is an alert target existing outside the field of view of the driver, the CPU transitions to step 560 and displays the first individual display screen 420 (refer to FIG. 4C).

When the margin time period difference ΔT is longer than the threshold ΔT1, the line of sight of the driver has to be securely guided in the direction of the alert target having the shorter margin time period TTC. Thus, the CPU makes a "No" determination in step 1410, transitions to step 1420, and again selects an obstacle having the shorter margin time period TTC (that is, an obstacle having the shortest margin time period TTC) as an alert target. Then, the CPU transitions to step 545 and displays the single display screen 400 (refer to FIG. 4A) including the sight guiding icon 401 that indicates the direction of the alert target. Consequently, the single display screen 400 including the sight guiding icon 401 that indicates the direction of the alert target having the shortest margin time period TTC is displayed. Then, the CPU transitions to step 1495 and temporarily finishes the present routine.

The present disclosure is not limited to the embodiments. Various modification examples can be employed within the scope of the present disclosure.

Figure 15:
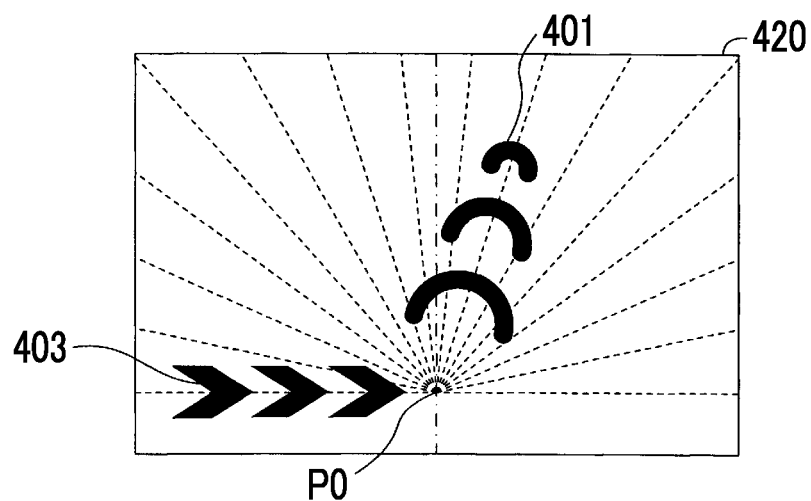
FIG. 15 is a descriptive diagram of a modification example of a sight guiding icon that indicates an alert target existing outside a field of view of a driver.

For example, the first apparatus, the second apparatus, and the like may use a field-of-view outside sight guiding icon 403 illustrated in FIG. 15 instead of the sight guiding icon 401 that guides the line of sight of the driver in the direction of the alert target existing outside the field of view of the driver. More specifically, the field-of-view outside sight guiding icon 403 is displayed in the left area LA in the first individual display screen 420 illustrated in FIG. 15. The field-of-view outside sight guiding icon 403 is displayed when the line of sight of the driver is guided in the direction of the alert target existing outside the field of view of the driver, and is not displayed when the line of sight of the driver is guided in the direction of the alert target existing within the field of view of the driver.

The field-of-view outside sight guiding icon 403 has a shape in which three arrows are linearly arranged. The direction of each arrow indicates the movement direction of the alert target existing outside the field of view of the driver. The direction of each arrow of the field-of-view outside sight guiding icon 403 illustrated in FIG. 15 indicates the direction of the host vehicle. Thus, the driver, by seeing the field-of-view outside sight guiding icon 403, can recognize that the alert target existing outside the field of view of the driver in the left area LA moves toward the host vehicle.

FIG. 15 illustrates an example in which the field-of-view outside sight guiding icon 403 is displayed in the first individual display screen 420. The field-of-view outside sight guiding icon 403 may be displayed instead of the sight guiding icon 401 in the second individual display screen 430 illustrated in FIG. 8.

By using the field-of-view outside sight guiding icon 403, an icon that indicates the direction of the alert target existing outside the field of view of the driver has a different shape from an icon that indicates the direction of the alert target existing within the field of view of the driver. Thus, the driver, by seeing the shape of the icon, can recognize whether the alert target exists within the field of view of the driver or exists outside the field of view of the driver.

In the "whole display screen 410 illustrated in FIG. 4B" that is displayed by the first apparatus and the second apparatus in step 555, the whole sight guiding icon 411 in which the length of each arc is set in advance to extend across the whole area within the field of view of the driver is uniformly displayed regardless of the directions to two alert targets (in other words, the angle between the directions). The length of each arc of the whole sight guiding icon 411 in the whole display screen 410 may be changed based on the directions to two alert targets (in other words, the angle between the directions).

Figure 16:
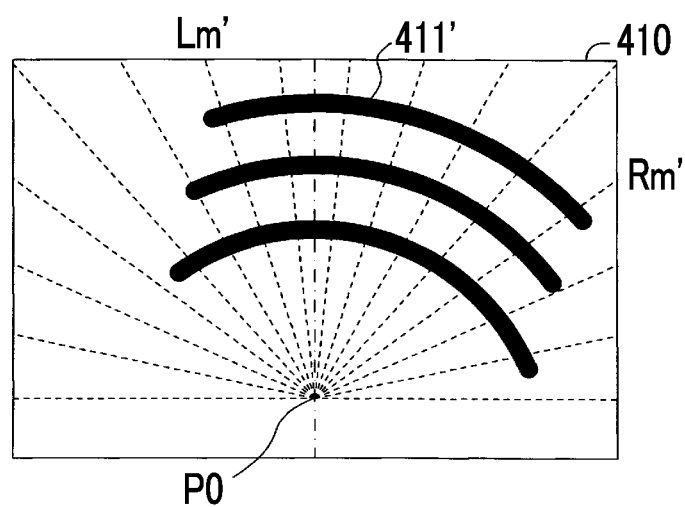
FIG. 16 is a descriptive diagram of a modification example of the whole display screen.

The change in the length of each arc of the whole sight guiding icon 411 will be more specifically described by using FIG. 16. When the CPU displays the whole display screen 410 in step 555, the CPU specifies the direction of the alert target that is positioned leftmost within the field of view of the driver (refer to a left end direction Lm' illustrated in FIG. 16), and the direction of the alert target that is positioned rightmost within the field of view of the driver (refer to a right end direction Rm' illustrated in FIG. 16). The CPU displays the whole display screen 410 including a whole sight guiding icon 411' in which the length of each arc extends from the left end direction Lm' to the right end direction Rm' about the predetermined position P0. The whole display screen 410 can appropriately guide the line of sight of the driver to the area where two alert targets exist, without guiding the line of sight of the driver in an excessively wide angular range.

Even when the length of each arc is a constant length determined in advance like the whole sight guiding icon 411, the line of sight of the driver is guided to the whole area in which two alert targets exist, by guiding the line of sight of the driver across the whole area within the field of view of the driver. Even when the length of each arc is changed according to the directions to two alert targets like the whole sight guiding icon 411', the line of sight of the driver is guided to the whole area in which the two alert targets exist. Accordingly, the whole display screen 410 is referred to as a "screen that guides the line of sight of the driver to the whole area including at least the area in which two alert targets exist".

The first apparatus and the second apparatus may change the field-of-view inside and outside determination threshold ($\theta r$ and $\theta l$) such that the field-of-view inside and outside determination threshold ($\theta r$ and $\theta l$) is decreased as the magnitude of the vehicle speed in the forward direction of the host vehicle SV is greater, from the viewpoint that the field of view of the driver is narrowed as the magnitude of the vehicle speed in the forward direction of the host vehicle SV is greater. In such a case, specifically, the ROM of the first apparatus and the second apparatus stores, in advance, the field-of-view inside and outside determination threshold ($\theta r$ and $\theta l$) that has a smaller value as the magnitude of the vehicle speed in the forward direction is greater. The CPU acquires, from the vehicle status sensor 13, the vehicle speed at the point in time of determining in step 550 whether or not the alert target exists outside the field of view of the driver. The CPU reads the field-of-view inside and outside determination threshold ($\theta r$ and $\theta l$) from the ROM and sets the field-of-view inside and outside determination threshold ($\theta r$ and $\theta l$) corresponding to the magnitude of the vehicle speed acquired from the vehicle status sensor 13. Then, the CPU determines whether or not the alert target exists outside the field of view of the driver, based on the set field-of-view inside and outside determination threshold ($\theta r$ and $\theta l$).

Accordingly, the field-of-view inside and outside determination threshold can be appropriately changed in accordance with the field of view of the driver that is widened or narrowed in accordance with the magnitude of the vehicle speed of the host vehicle SV. A determination as to whether or not the alert target exists outside the field of view of the driver can be more accurately performed.

The sight guiding icon 401, the whole sight guiding icon 411, and the field-of-view outside sight guiding icon 403 may have any design as long as having each function of guiding the line of sight of the driver described above.

When the CPU in step 520 extracts an obstacle from objects detected by the front radar sensor 12C, the CPU extracts an object satisfying the following condition as an obstacle. The condition is that the object is determined to be "within the predicted traveling course area ECA or may enter the predicted traveling course area ECA" and the camera sensor 11 determines that the object is a pedestrian. The CPU may extract, as an obstacle, an object that is determined to be "within the predicted traveling course area ECA or may enter the predicted traveling course area ECA" regardless of whether or not the object is a pedestrian.

What is claimed is:
1. An in-vehicle alert apparatus comprising:
an object information acquiring unit configured to acquire object information related to a position and a direction of an object around a host vehicle with respect to the host vehicle;
a vehicle status information acquiring unit configured to acquire vehicle status information related to a traveling status of the host vehicle;
a display unit configured to display of an alert screen which guides a line of sight of a driver; and
an electronic control unit,
the electronic control unit configured to,
extract, based on the object information and the vehicle status information, obstacles having a possibility of colliding with the host vehicle, calculate, based on at least the object information, an alert degree indicating a degree of providing alert for each obstacle, select, based on the alert degree, each of two obstacles including an obstacle having the highest alert degree as an alert target from the obstacles, and display the alert screen on the display unit, wherein the electronic control unit determines whether or not the alert target exists outside a field of view of the driver, when one alert target is selected, displays a single display screen as the alert screen, the single display screen including one display element that guides the line of sight of the driver in a direction of the one alert target, when two alert targets are selected and all of the two alert targets are determined to exist within the field of view of the driver, displays a whole display screen as the alert screen, the whole display screen including one display element that guides the line of sight of the driver in a direction of a wide-angle range including a direction of each of the two alert targets, and when two alert targets are selected and an alert target having the highest alert degree is determined to exist outside the field of view of the driver, displays an individual display screen as the alert screen, the individual display screen including one display element that guides the line of sight of the driver in a direction of at least the alert target determined to exist outside the field of view of the driver.

2. The in-vehicle alert apparatus according to claim 1, wherein:

the electronic control unit determines that the alert target exists within the field of view of the driver, when a magnitude of an angle between a field-of-view inside and outside determination reference line that extends forward along an axis extending in a front-rear direction of the host vehicle from a predetermined position in the host vehicle, and a direction line from the predetermined position to the alert target is less than a field-of-view inside and outside determination threshold; and the electronic control unit determines that the alert target exists outside the field of view of the driver, when the magnitude of the angle is greater than or equal to the field-of-view inside and outside determination threshold.

3. The in-vehicle alert apparatus according to claim 2, wherein the predetermined position is set to a position between a backrest portion of a driver seat on which the driver sits, and a steering wheel disposed in front of the backrest portion.

4. The in-vehicle alert apparatus according to claim 2, wherein the electronic control unit sets the field-of-view inside and outside determination threshold such that the field-of-view inside and outside determination threshold is decreased as a magnitude of a vehicle speed of the host vehicle is greater.

5. The in-vehicle alert apparatus according to claim 1, wherein the electronic control unit, in a case of displaying the individual display screen, when the alert target that does not have the highest alert degree of the two selected alert targets is determined not to exist outside the field of view of the driver, displays a screen as the individual display screen, the screen including the one display element that guides the line of sight of the driver in a direction of the alert target determined to exist outside the field of view of the driver, and another display element that guides the line of sight of the driver in a direction of the alert target determined not to exist outside the field of view of the driver.

6. The in-vehicle alert apparatus according to claim 1, wherein:

the electronic control unit is configured to select, based on the alert degree, the obstacle having the highest alert degree and an obstacle having the second highest alert degree as the alert target from the obstacles; and the electronic control unit, when two alert targets are selected and the alert target having the second highest alert degree exists outside the field of view of the driver, displays an individual display screen as the alert screen, the individual display screen including one display element that guides the line of sight of the driver in a direction of at least the alert target having the second highest alert degree.

7. The in-vehicle alert apparatus according to claim 6, wherein:

when two alert targets are selected with one of the two alert targets existing outside the field of view of the driver and the other not existing outside the field of view of the driver, the electronic control unit extracts an obstacle having the third highest alert degree from the obstacles and determines whether or not the extracted obstacle exists outside the field of view of the driver; and when an obstacle having the third highest alert degree exists and the obstacle is determined not to exist outside the field of view of the driver, the electronic control unit displays a screen as the individual display screen, the screen including one display element that guides the line of sight of the driver in a direction of the alert target determined to exist outside the field of view of the driver, and one display element that guides the line of sight of the driver in a direction of a wide-angle range including a direction of each of the alert target determined not to exist outside the field of view of the driver and the obstacle having the third highest alert degree.

8. The in-vehicle alert apparatus according to claim 1, wherein:

the electronic control unit is configured to select, based on the alert degree, the obstacle having the highest alert degree and an obstacle having the second highest alert degree as the alert target from the obstacles;

when two alert targets are selected, the electronic control unit determines whether or not a magnitude of a difference in alert degree between the two alert targets is less than or equal to a predetermined threshold;

when the magnitude of the difference in alert degree is greater than the predetermined threshold, the electronic control unit displays the single display screen including one display element that guides the line of sight of the driver in a direction of the alert target having the highest alert degree;

when the magnitude of the difference in alert degree is less than or equal to the predetermined threshold and all of the two alert targets are determined to exist within the field of view of the driver, the electronic control unit displays the whole display screen; and when the magnitude of the difference in alert degree is less than or equal to the predetermined threshold and the alert target having the highest alert degree exists outside the field of view of the driver, the electronic control unit displays the individual display screen.

9. The in-vehicle alert apparatus according to claim 1, wherein:
the electronic control unit divides an area around a front of the host vehicle into a first area on a left side of the host vehicle and a second area on a right side of the host vehicle;
the electronic control unit selects each of an obstacle having the highest alert degree in the first area and an obstacle having the highest alert degree in the second area as the alert target from the obstacles; and
when two alert targets are selected and at least one of the two alert targets is determined to exist outside the field of view of the driver, the electronic control unit displays a screen as the individual display screen, the screen including the one display element that guides the line of sight of the driver in a direction of one of the two alert targets, and the one display element that guides the line of sight of the driver in a direction of the other of the two alert targets.

10. The in-vehicle alert apparatus according to claim 1, wherein:
the electronic control unit divides an area around a front of the host vehicle into a first area on a left side of the host vehicle and a second area on a right side of the host vehicle;
the electronic control unit selects each of an obstacle having the highest alert degree in the first area and an obstacle having the highest alert degree in the second area as the alert target from the obstacles;
when two alert targets are selected with one of the two alert targets determined to exist outside the field of view of the driver and the other determined not to exist outside the field of view of the driver, the electronic control unit extracts an obstacle having the second highest alert degree in one area of the first area and the second area where the alert target determined to exist outside the field of view of the driver exists;
when an obstacle having the second highest alert degree does not exist, and when an obstacle having the second highest alert degree exists and the obstacle is determined to exist outside the field of view of the driver, the electronic control unit displays a screen as the individual display screen, the screen including the one display element that guides the line of sight of the driver in a direction of an alert target, of the two alert targets, determined to exist outside the field of view of the driver, and the one display element that guides the line of sight of the driver in a direction of the remaining alert target of the two alert targets; and
when an obstacle having the second highest alert degree exists and the obstacle is determined not to exist outside the field of view of the driver, the electronic control unit displays a screen as the individual display screen, the screen including the one display element that guides the line of sight of the driver in a direction of an alert target, of the two alert targets, determined to exist outside the field of view of the driver, and one display element that guides the line of sight of the driver in a direction of a wide-angle range including a direction of the remaining alert target of the two alert targets and a direction of the obstacle having the second highest alert degree.

11. An alert method of a vehicle including an object information acquiring unit configured to acquire object information related to a position and a direction of an object around a host vehicle with respect to the host vehicle, a vehicle status information acquiring unit configured to acquire vehicle status information related to a traveling status of the host vehicle, a display unit configured to display of an alert screen which guides a line of sight of a driver, and an electronic control unit,
the electronic control unit configured to,
extract, based on the object information and the vehicle status information, obstacles having a possibility of colliding with the host vehicle,
calculate, based on at least the object information, an alert degree indicating a degree of providing alert for each obstacle,
select, based on the alert degree, each of two obstacles including an obstacle having the highest alert degree as an alert target from the obstacles, and
display the alert screen on the display unit,
the alert method comprising:
determining whether or not the alert target exists outside a field of view of the driver;
when one alert target is selected, displaying a single display screen as the alert screen, the single display screen including one display element that guides the line of sight of the driver in a direction of the one alert target;
when two alert targets are selected and all of the two alert targets are determined to exist within the field of view of the driver, displaying a whole display screen as the alert screen, the whole display screen including one display element that guides the line of sight of the driver in a direction of a wide-angle range including a direction of each of the two alert targets; and
when two alert targets are selected and an alert target having the highest alert degree is determined to exist outside the field of view of the driver, displaying an individual display screen as the alert screen, the individual display screen including one display element that guides the line of sight of the driver in a direction of at least the alert target determined to exist outside the field of view of the driver.

* * * * *